United States Patent [19]
Volpe Prignano

[11] Patent Number: 5,846,084
[45] Date of Patent: Dec. 8, 1998

[54] METHOD FOR CREATING THREE-DIMENSIONAL FIGURES OR FORMS FROM ANY FLAT SURFACE IMAGE

[76] Inventor: Juan Pedro Alfredo Hector Volpe Prignano, 10 de Mayo 4051 Dpto. "1", Lanus Oeste, Provincia de Buenos Aires, Argentina

[21] Appl. No.: 658,482

[22] Filed: Jun. 5, 1996

[30] Foreign Application Priority Data

Dec. 26, 1995 [AR] Argentina ................................ 334.803

[51] Int. Cl.⁶ ................................................... G09B 25/06
[52] U.S. Cl. ........................................... 434/151; 446/118
[58] Field of Search ..................................... 382/285, 154, 382/100; 395/118, 119, 125, 126; 428/15, 13; 434/135, 151, 72, 73; 446/118, 119, 120, 139

[56] References Cited

U.S. PATENT DOCUMENTS

| | | | |
|---|---|---|---|
| 3,793,506 | 2/1974 | Deschamps et al. | 382/285 |
| 4,874,176 | 10/1989 | Auerbach | 446/118 |
| 4,979,224 | 12/1990 | Maiocco et al. | 382/199 |
| 5,096,204 | 3/1992 | Lippman | 446/478 |
| 5,203,847 | 4/1993 | Butt | 434/73 |
| 5,362,054 | 11/1994 | Ashemimry | 434/72 |
| 5,441,262 | 8/1995 | Figone et al. | 428/33 |
| 5,566,246 | 10/1996 | Rao | 382/154 |

*Primary Examiner*—Yon J. Couso
*Attorney, Agent, or Firm*—Edwin D. Schindler

[57] ABSTRACT

A process is disclosed for creating three-dimensional figures or forms starting from any flat surface image. The process includes the steps of selecting an illustration to be reproduced in three dimensions and then preparing an assistance plan for the assembly starting from the figures own, or cast, shadow. Thereafter, contour drawings are made of each piece, joining each point that defines a level, following the model's contour until arriving back at the point of departure. The design is then broken down by drawing each of the component pieces thereof individually and cataloging them and grouping them by material, texture and color; making the pieces obtained from the individual drawings, then grouping and cataloging by level each of the fabricated pieces. A base or theoretical point is space is determined over which the work will be assembled; marking at level zero, or the base, the position at which level one will be placed on the base. The assembly of the three-dimensional work is then commenced with the aid of the design so created, by joining corresponding pieces of level one to zero, those of level two to level one, etc., until arriving at the last level planned.

24 Claims, 23 Drawing Sheets

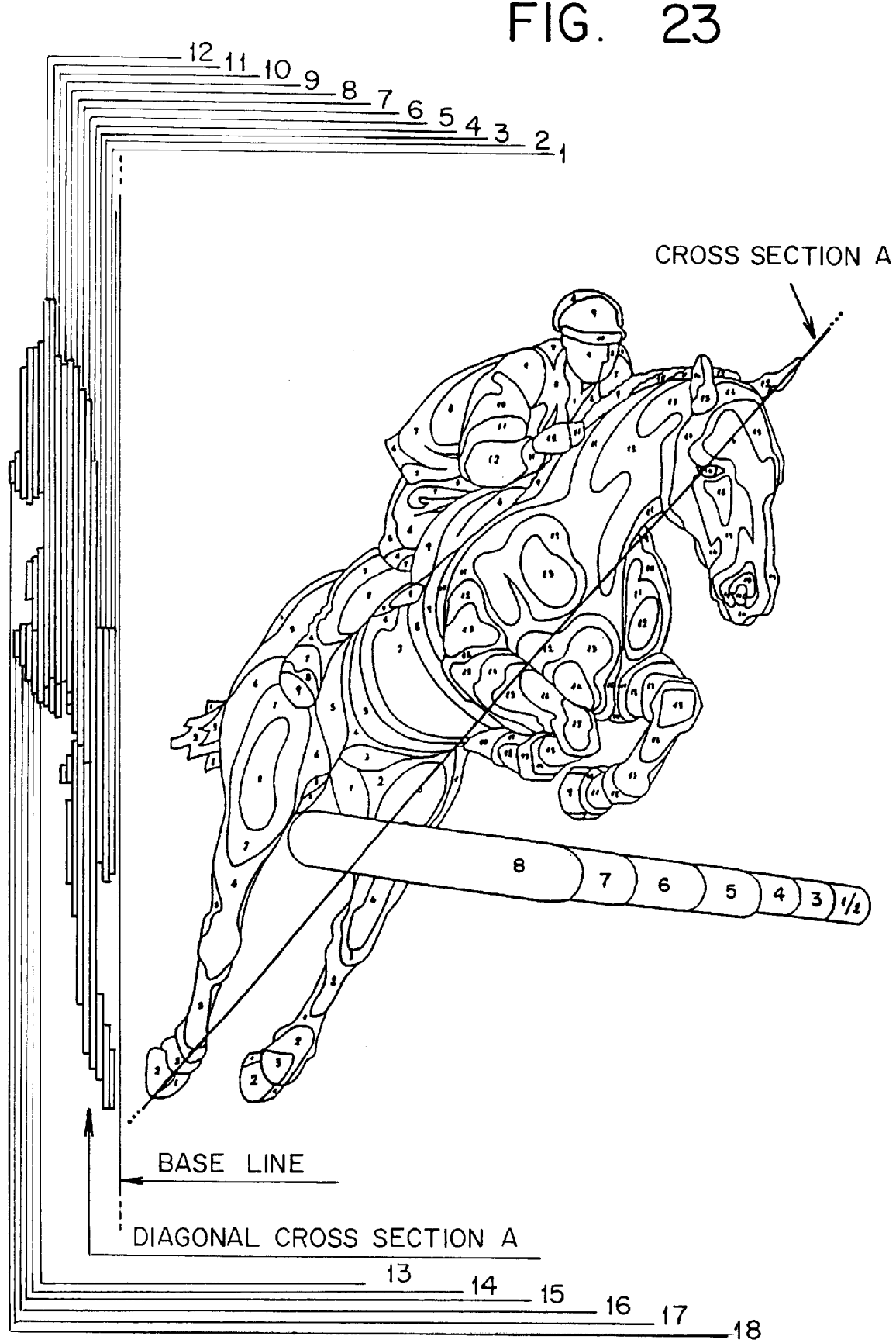

METHOD FOR CREATING THREE-DIMENSIONAL FIGURES OR FORMS FROM ANY FLAT SURFACE IMAGE

BACKGROUND OF THE INVENTION

1. Technical Field of the Invention

This invention involves a procedure for creating three-dimensional figures or forms from any flat surface image, by means of which drawings, photographs, maps, blueprints and other items are transformed into three-dimensional forms or figures that occupy volume in space, superimposing a series of apparently disconnected pieces which, lined up along two previously set up guide planes, shape said form or figure on the basis of the effects of light and shade.

2. Description of the Prior Art

Various systems for forming three-dimensional figures are known in the state of the art, as for example the artisan crafts of carving, which goes from the full to the empty, modeling and sculpture. Other industrial techniques are known based on the inverse principle (from the empty to the full), as in cast molding, formation through injection of plastics into a matrix, extrusion, etc. Finally, it is also known how to finish a figure (for example a puppet) by superimposing three or four separate plates of the same material which when glued or magnetized together in a logical juxtaposition give form to a particular finished figure. All these methods, both artisan and industrial, permit the production of particular three-dimensional figures with different degrees of detail and finishing, but it is impossible using those means to be able to reproduce with volume a flat surface model, for example a photograph, with the full range of lights and shades, background and figures, empty spaces and occupied spaces, etc., which is the novelty of the proposed procedure.

AREAS OF APPLICATION a) In the fields of architecture, the plastic arts, landscaping and scenography, this procedure permits the quick and economical production of the planned components, using cardboard, bristol board, frames with cloth or paper, or other materials, that will aid the designer in giving form to the preliminary plan and in presenting it in real space, or in stages, in order to test and, if necessary, to modify without greater expense, the effects that he wants to achieve with the finished product, both in its occupation of space with the measurement of where it will be placed, and in the study of the lighting effects and the projection of shadows, which will be of great help in the production of the scale model and/or the final plan.

b) Instructors, teachers, technicians in the manufacturing fields and anyone with similar curiosity about the creation and production of imaginative, creative and educational games.

The procedure can be used to make a game that, if desired, can be included in the category of jigsaw puzzles, but in relief, with a greater complexity than that of the two-dimensional ones now known, that could easily include from 1 to 50 or more times the number of pieces, providing its users, in the case of children, with new creative and manual exercises, encouraging natural and spontaneous concentration, undoubtedly representing an advantageous aid in the teaching of subjects involving visual and material composition, anatomy, landscaping, perspective and possibly geography, history or other subjects, all in the form of a game.

For adults it offers the chance to exercise ingenuity and the artistic and creative senses, besides developing and putting into practice technical knowledge in the area of the assembly of levels and following the rules of construction, being careful to give the necessary support to the level already attached or fit together by other means, to bear the stress and weight of the levels that are immediately and subsequently added on. The games that will be studied will be of different degrees of complexity, divided into progressive stages by age and/or mental capacity.

c) Paintings, sculptures, decorations, gifts, handicrafts, murals, metal castings, logotypes, escutcheons, emblems, coats of arms, etc.

BASIC PRINCIPLES

The visualization of any object in its form, in the expression of its total volume or intrinsic parts, with its emplacement in space in relation to another object or other objects that precede or follow it, is defined by us by means of the optical reality expressed by the shadow caused by a light source falling on the object and its continuation toward or over subsequent solid obstacles. The source of light can be natural, occasional or directed at the selected object; and the change of position of the source will lead to different visualizations and expressions of the object.

These lighting variations can be intended to achieve created visual effects, shaping the selected object into the form and expression of its natural state, or with the distortions that one may want to make.

These principles of LIGHT and SHADE are normally expressed in any flat surface model that one chooses to reproduce with volume and, in the case of line drawings or graphic markings, one takes into account the expressions naturally indicated by logic or the scaled sequence of markings, taking as an example the use of the first signal of sonar to correspond to the nearest solid point. Likewise the anatomic volume of the arm, the sequence in perspective of the houses on a street or the relation between mountain peak and valley are naturally known. Knowledge and study of the selected model are then utilized.

The visualizing effects of the contrasts of light and shade and their intermediate variations in intensity, are the basis for the PROCEDURE for giving three-dimensionality, starting indistinctly from the illuminated area, or from the area of deepest shade.

SUMMARY OF THE INVENTION

The procedure for creating three-dimensional figures or forms from any flat surface image, which this invention patent application seeks to protect, comprises the following stages.

1st Stage—Selection and Preparation of the Model

The illustration to be reproduced is selected with the contrasts of LIGHT and SHADE adequately marked to bring out the characteristic or desired features and forms of the model. In the case of having chosen an originally three-dimensional object or figure or any subject at all, one proceeds to transfer it onto a flat surface, using drawing, photography or other media, always giving priority to the contrast of light and shade that should characterize the aforementioned basic lines, the identifying features of the peculiarities and characteristics of the model, taking into account that the gradation of intensity of the shadow indicates the depths and reliefs of the parts. The gradation of intensity of the shade is the basic guide for the series of line drawings that together will form the plan with which volume will be given to the flat surface model.

2nd Stage—Marking of the Levels

The natural or projected shade resulting from STAGE ONE is classified by its sequence of intensity and is subdivided into consecutive points, from the darkest part to the brightest, or vice versa, in the figure or figures composing the work, knowing that each point represents a flat level of the figure, and the number of points that subdivide the shading indicate the number of levels, parallel to each other, that will later give the final volume to the work, and the distance or proximity between them defines the greater or lesser intensity of the shade. As an illustrative example, a visible and wide surface is brighter than a narrower one, and the sequence of narrow surfaces given by the proximity of the points indicating the levels causes the deepest shade.

In this stage the levels that one wants to give to the work are marked. It is possible to add to them simply by increasing the number of points of subdivision of the shaded areas, at the same time also increasing the definition of detail of the finished model. For this stage of the procedure it is first necessary to define and mark the imaginary point ZERO in space or on the real and concrete base, from which the sequence of points marking the levels is distributed in an increasing and/or decreasing order, or horizontally, vertically, laterally or diagonally, but always with a view of parallel sections. The number of levels that the work will have is defined by the designer, who will be limited by logic, aesthetics, reason or necessity.

This stage of the PROCEDURE can be performed manually, mechanically, by computer or other technology.

3rd Stage—Drawings of the Contours of the Levels and the Pieces

From each point that defines a level, marked in the prior stage, a line starts that must strictly follow the contour of the model, on the same level of intensity of shade corresponding to it, and it ends by returning to its point of departure, closing a line that forms an apparently shapeless and irregular drawing. This procedure is repeated as many times as there are points that have beet marked, with each line rigorously following the level whose intensity of shade corresponds to it in the visible section of the model, but modifying its path and pattern in the parts that, due to the peculiarity of the work, this level covers and overhangs in one or more sections of the preceding level's contour. This situation is found in forms and figures, or in parts of the same, that are extended in space from the level which one has reached, being progressively or abruptly displaced outside of it and/or subsequent levels, in relation to the base level or the preceding level, and for that reason the contour, in the section that will be covered by the displacement of the following level, proceeds from its contour of shadow in a lateral extension that will form the support surface of the following level or levels, which must be calculated in relation to the weight and stress to be borne through the continuity of surfaces that will be displaced from each subsequent level (each of which must be calculated individually), returning to its end point with the corresponding line of shade, connecting with the initial point of departure. This procedure must be performed simultaneously in every sector of the work, if it is composed of several figures or forms, or if the irregularity of movement of a single figure so requires, or if one level is the base of several support points independent of each other, within the level or moving laterally into space.

The level's projecting surface, the base of the subsequent level, can be of a size smaller than calculated, compensating by means of invisible internal pins or bolts for its function of backing and support.

This stage of the PROCEDURE can be performed mechanically, manually, by computer or other technology.

4th STAGE—End of the Project

In the preceding stage the series of drawings took shape that are the matrix for assembling the pieces corresponding to each level that will form the work. The pieces will afterwards be joined together in a parallel form, supporting each other on their two flat surfaces. If due to the peculiarity of the work, or the desire of the designer, the work is a mixed composition and two or more colors, materials or textures coincide in one piece on the same level, the lines corresponding to the incisions and indentations for its subdivision into the necessary sections are marked on the layout of this same piece, making them in such a place and manner that said incisions or indentations are covered or hidden by the pieces of the following level. Having finished the procedure of designing the outline of the pieces of each level and their possible subdivisions, up to the final one that has been planned, we have come to the diagram that groups together all the levels and the pieces corresponding to each of them. An apparent tangle of lines, it is in fact the guide for the assembly and exact emplacement of all the levels and pieces in their corresponding positions to form the work, in which positions the visible line of the cut for shading in the model and the transparency of the piece's line of extension are covered by the superimposed level. If greater assistance in the assembly is desired, the model can be drawn to delineate only its contour and the visible part of the cuts for shading, annotating the numbering that corresponds to each level.

This stage of the PROCEDURE can be performed mechanically, manually, by computer or other technology.

5th STAGE—Drawing of the Matrix

Next the design is broken down, proceeding to draw each of its pieces individually, grouping and cataloging them by level and, in the case of a mixed composition, also by category of material, texture or color. These drawings are the models for matrices, molds, punches, or other media for producing the pieces mechanically in the material, technology or technique selected for producing the work, permitting the model to be reproduced in assembly line fashion at a truly low cost or adjustable according to the material and technology chosen.

Every procedure detailed herein can be performed with the drawings life-sized or to scale. The drawings can also be enlarged, reduced or distorted in whole or in part, as deemed necessary and/or as the work itself requires.

As in the preceding stages, this PROCEDURE can be performed mechanically, manually, by computer or other technology.

6th STAGE—Making of the Pieces

The concrete and solid pieces obtained from the molds, matrices, punches, etc. of the preceding stage, can be arranged in three versions, according to the production procedure adopted and the needs for preparation of the prototype model and the final work:

VERSION "A"—Plates of different or equal depth bordered by two flat surfaces, opposite, parallel or diagonal to each other, with the contour depth abstract and irregular in form. The joining of the plates to each other, connected by their two flat surfaces, creates three-dimensional volume, and the contour drawing, apparently shapeless and abstract, complements and combines with those of the preceding and following levels, thus giving form to the figure.

VERSION "B"—Plates of different depth bordered by two surfaces, parallel or diagonal to each other, one with a smooth surface and the other molded, stamped, engraved, worked in high or low relief, or prepared in other ways and with the contour depth apparently abstract and irregular in form. The joining of the plates to each other, connecting the smooth surface to the support points entered on the worked surface, creates three-dimensional volume, and the contour drawing is complemented by those of the preceding and following levels, giving visual form to the model.

VERSION "C"—Plates of different depth, as described in version "B", can be molded, embossed, modeled, etc., on both surfaces and connected to each other by means of support points, pins or bolts, programmed in the layout. The procedure in versions "B" and "C" has the benefit of facilitating the formation of works that have the peculiarity of having to leave internal parts visible, on different levels, simultaneously appending different materials, colors and/or textures to one or more levels, with three-dimensional or double-sided visualization, as well as of works of a realistic pattern of construction, principally applicable to the casting of metals in models such as artistic and/or decorative murals, sculptures, logotypes, escutcheons, emblems, coats of arms, decorations for the house and for personal use, gifts, etc.

7th STAGE—Assembly of the Pieces

Having finished the sequence in the 6th STAGE of the PROCEDURE, we find ourselves with a multiplicity of pieces with the contour depth irregular and abstract in form. The pieces, with the guide of the layout prepared in the 3rd STAGE, will form the three-dimensional work. At first one should separate them and group them by the numbering of the level to which they belong. Next, using the layout, level ONE is placed in the theoretical place in space, either the base or level ZERO, over which the work will be assembled, and the three-dimensionality is begun with the joining of the side of level ONE with the flat surface to the corresponding side of ZERO. Then one proceeds to do the same with TWO over ONE, THREE over TWO, continuing in this way until all the pieces have been positioned and all the planned levels have been completed. At the same time, or subsequently, the same procedure is followed on the opposite surface of ZERO, with MINUS ONE over ZERO, MINUS TWO over MINUS ONE, etc.

For the exact emplacement of each piece in its appropriate position in the work, one proceeds to put it with precision over the general plan, or layout, which appears to be a tangle of lines. Upon placing the piece to be assembled in its corresponding position, it covers, hiding beneath it, the line drawings of the pieces from the following levels, leaving only the lines from the preceding levels visible. One should then seek and find points of reference within the contour of each piece, the line corresponding to the immediately preceding level and between each other. The pieces do not have preset marks, so that one should seek and choose points that can be meeting points, tangential points, points of intersection, or set distances between the two lines or other points of reference that may be found to define at least two or three of these points and then transfer the piece to the work. The procedure of emplacement of the piece in its corresponding position should be done as perfectly as possible, being guided by the selected reference points. This procedure is followed in the same way as many times as the work has pieces and levels, with the emplacement in an ascending or descending order from what has been designated level ZERO, or from any level at which one has arrived in the assembly, in one or more simultaneous parts thereof.

Finish of the Assembly of the Piece or Work

With the finishing of the work, the three-dimensionality of the originally flat model has been achieved, which has the outstanding novelty of constructing volume through shadings projected by the cut of the contour of the pieces of a level, over the parts of the preceding levels with visible flat surfaces, lower than and/or behind the source of light, in an untraditional conception that is pleasing and aesthetic.

The levels and/or pieces of levels that make up the work can be cut, stamped out, blended, injected, molded, shaped or prepared with any material, placed or presented parallel to each other, grouped vertically, horizontally, diagonally, from top to bottom, from bottom to top, from left to right and vice versa or diagonally, in its entirety or partially, with the ability to insert separately, glue together, weld, nail, screw, embed, cast, magnetize, forge or carve in any material or metal, individually, in a single block or in various parts that join together to form a whole.

DETAILED DESCRIPTION OF THE DRAWING FIGURES

For greater clarity and understanding of the stages of the procedure that is the subject of this invention, we have used as an illustrative but not restrictive example the figure of a rider on horseback clearing a wooden obstacle, 3 mm. in depth and in four different colors.

Figure 1:
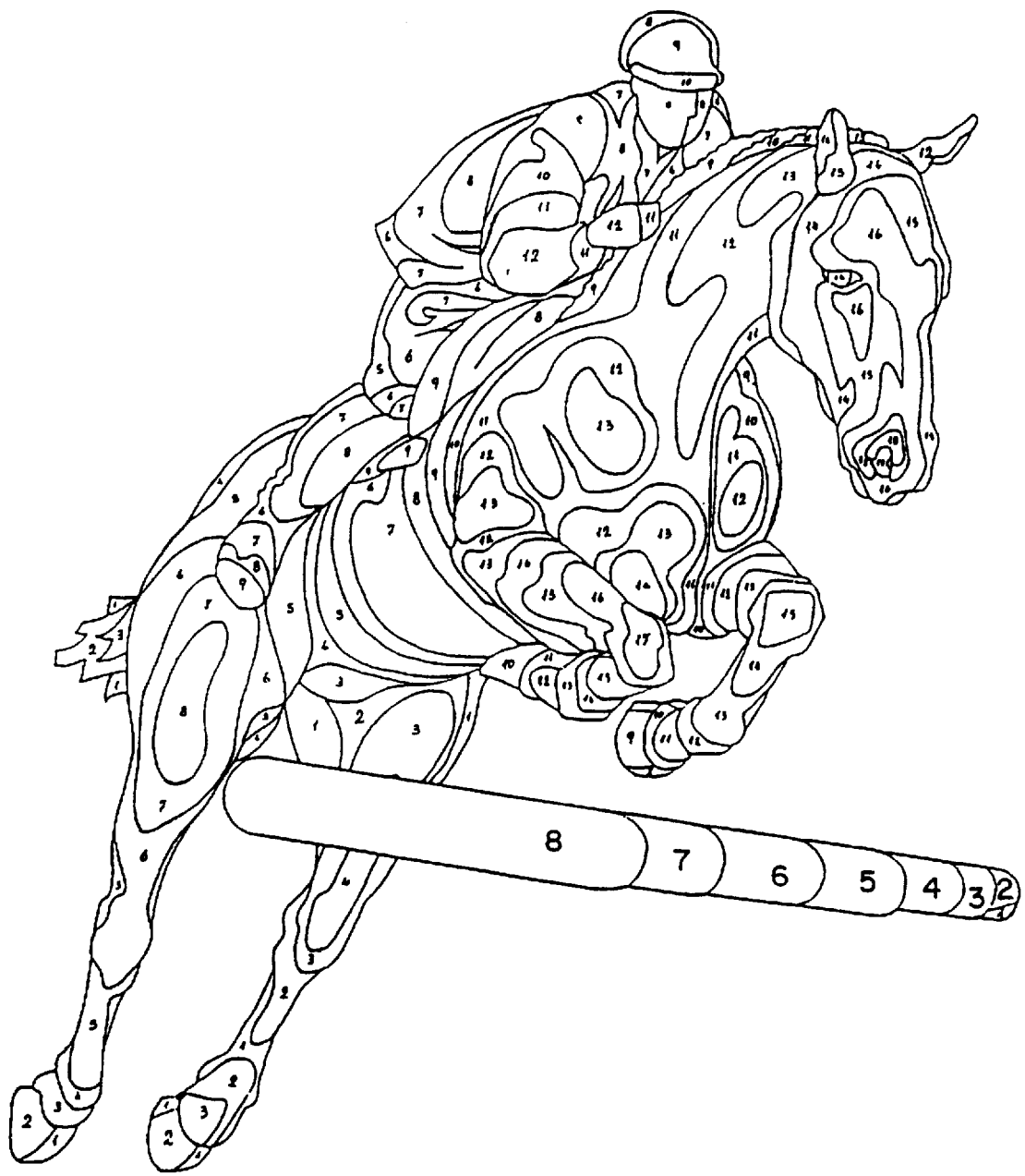

FIG. 1 Plan of reference for the assembly, with the numbering of the levels. This is the first step working from the model, in which the lines are drawn that emerge from the points of subdivision of the intensity of the shading in the original. In it is also defined the number of levels (volume) that one requires, or wants to give to the work, choosing the limitation of visual effects with a few levels or the greater definition of details and depth. In this part of the project, the principal focus should be the design of the shading, without concern for the accuracy of a muscle or other form, and then the shade given by the cut of the contour of the piece will reproduce said shade and, without having reconstructed the model as minutely and faithfully as it would have been in classical form, it will stand out visually.

Figure 2:
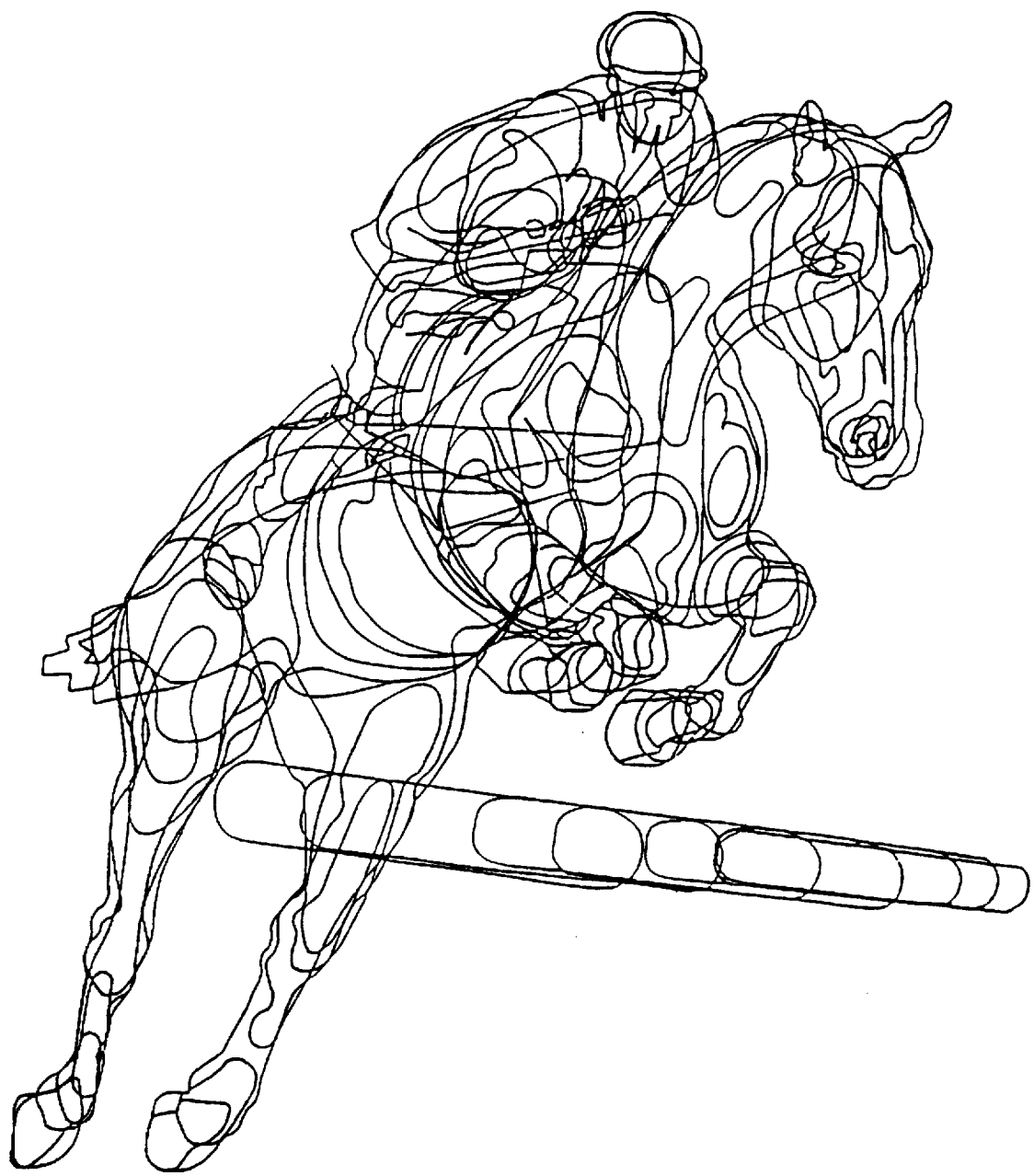

FIG. 2 General plan for the assembly of the pieces in which all the levels and corresponding pieces are involved, with the drawing of the contours visible and the extension covered by the following levels. The breakdown of the drawing is what provides the design of the pieces for industrial production matrix making, in which on placing the piece that corresponds to a particular level over the plan only the drawing of the levels already positioned is visible.

Figure 3:
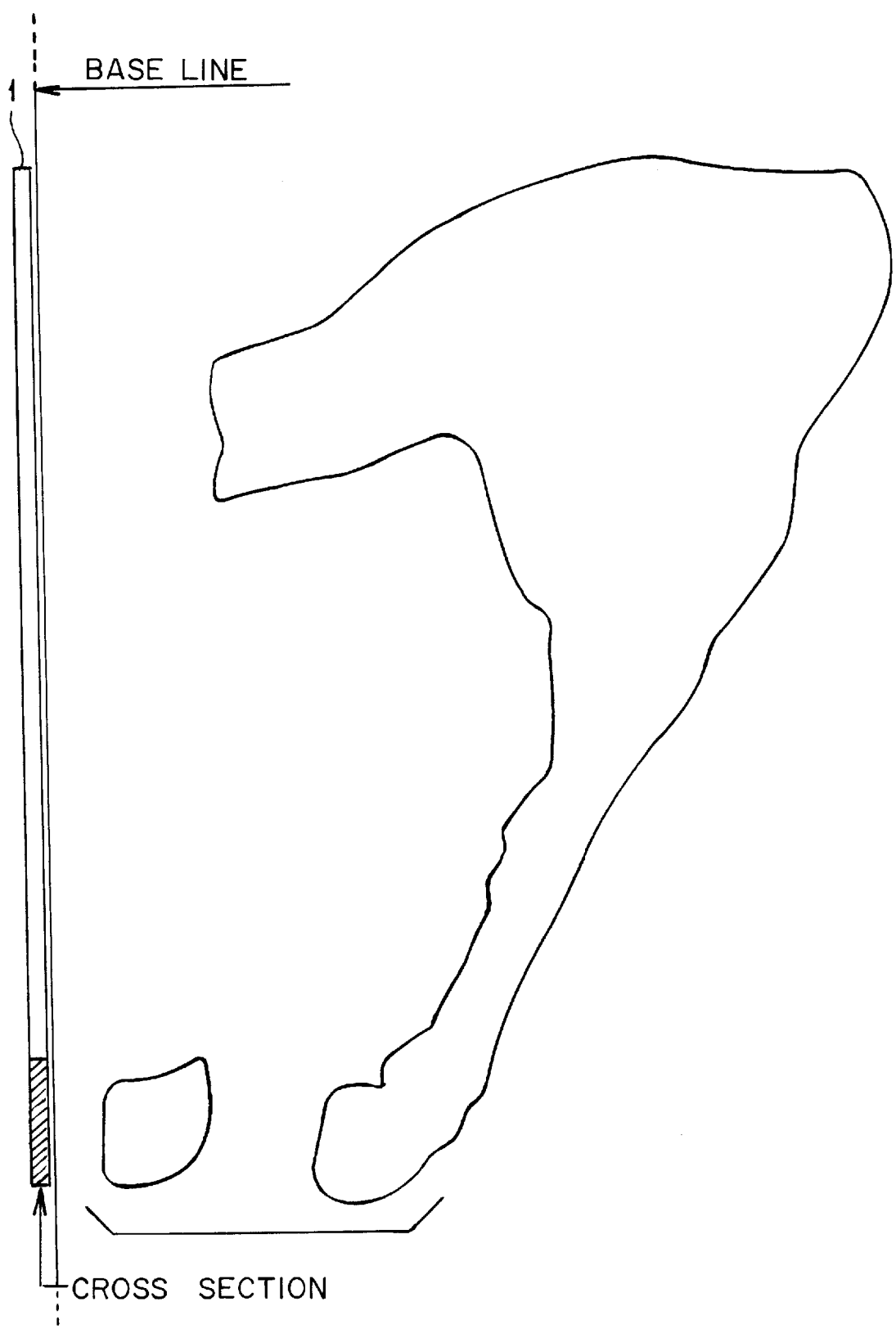

FIG. 3: LEVEL 1—over the base of the picture. (If it is a three-dimensional figure, the same procedure will be followed but on the opposite side, starting for level zero or directly from MINUS ONE.) Start of level ONE over the base, departing simultaneously from two points that are independent of each other (in this case).

Figure 4:
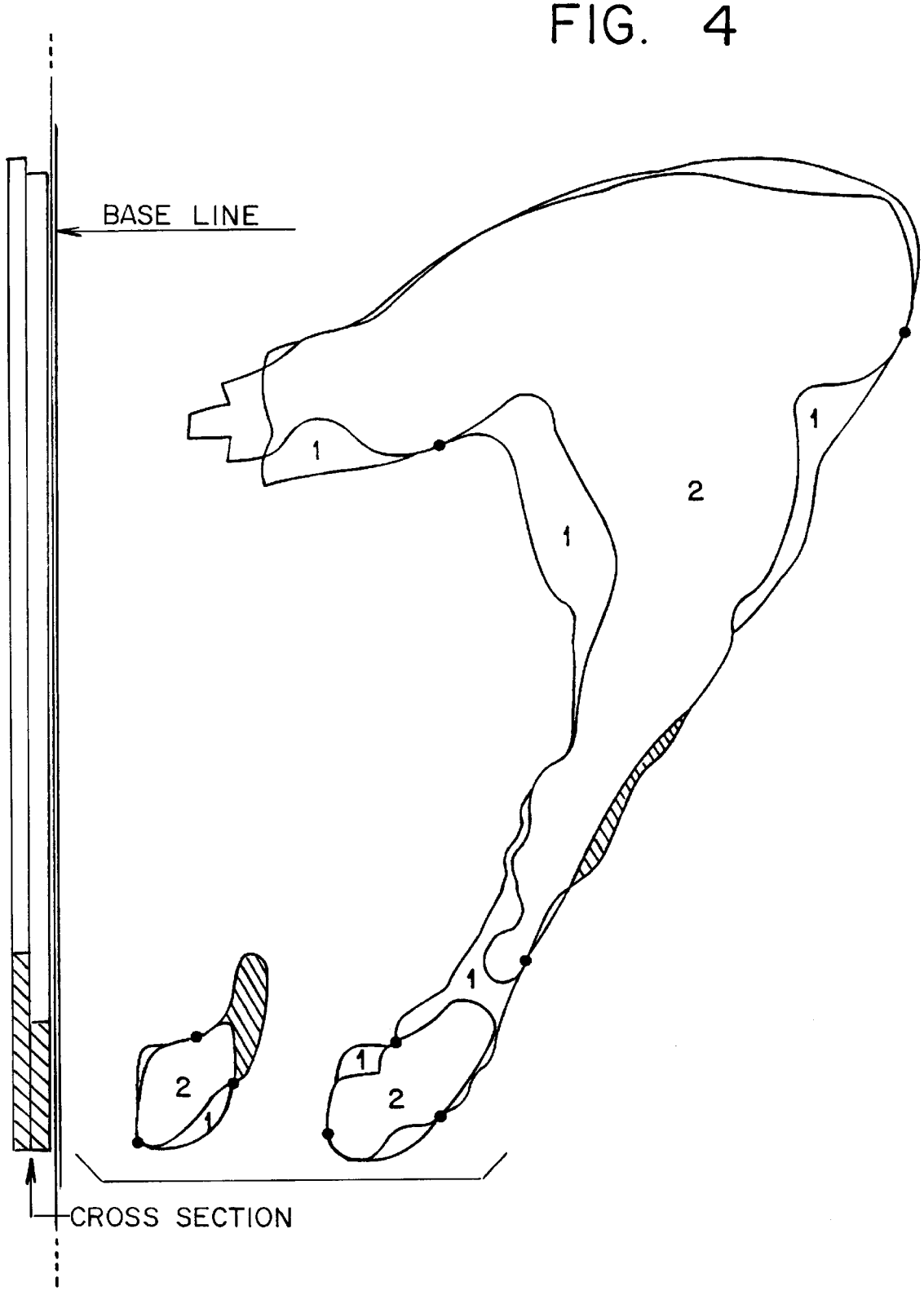

FIG. 4: LEVEL 2 Points of coincidence or tangential points that have been exposed and taken as a reference for the exact emplacement of level 2 over the first level.

The spaces marked with lines indicate the projection of the piece outside of the contour of the immediately preceding level.

These points of reference are chosen, not required. In every case the creator or assembler of a work can select the ones that he considers most suitable or easiest to refer to.

Figure 5:
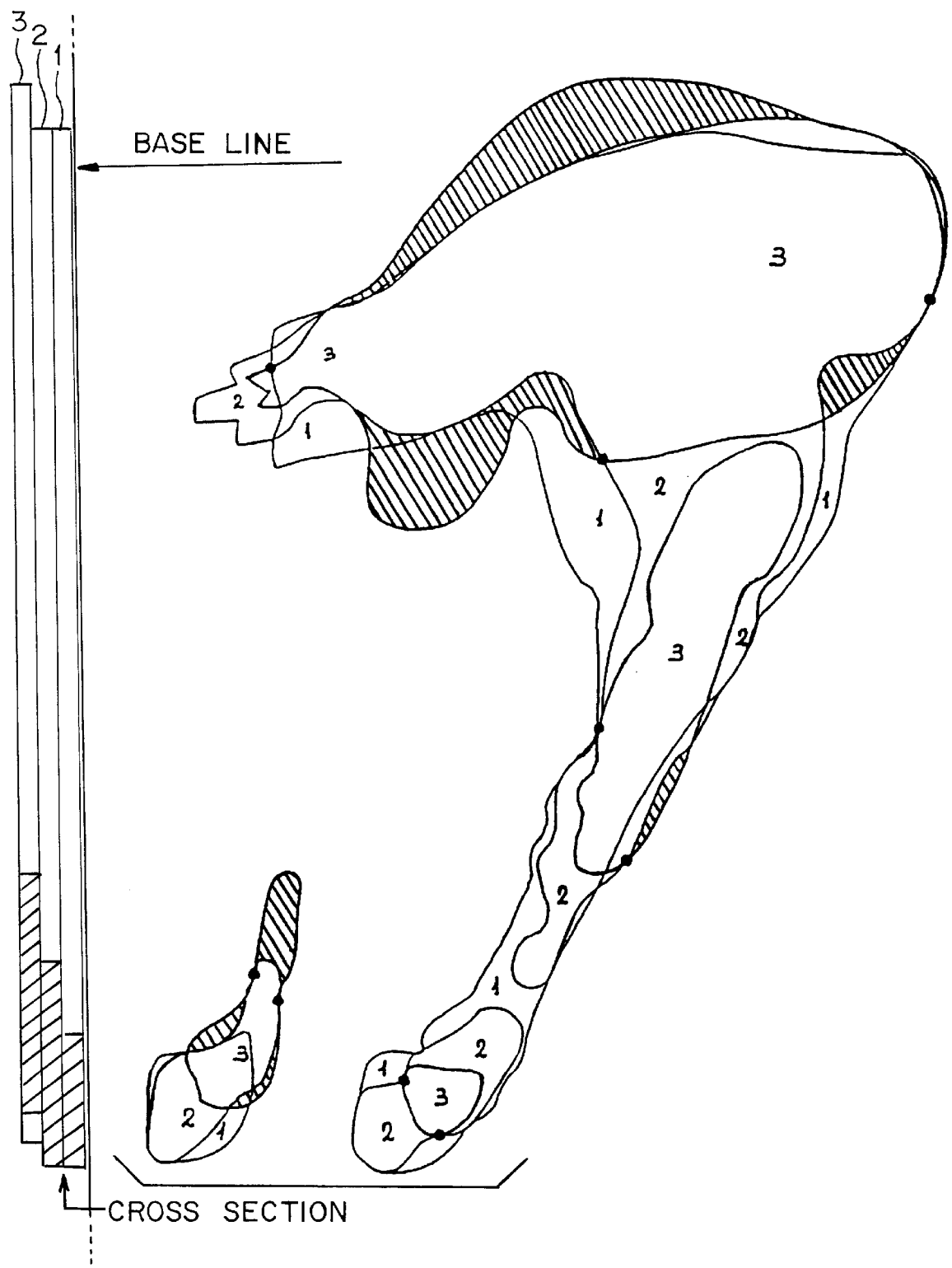

FIG. 5: LEVEL 3 Emplacement of this level over level 2, with its points of reference and lateral section illustrative of the projection of part of the piece into space.

Figure 6:
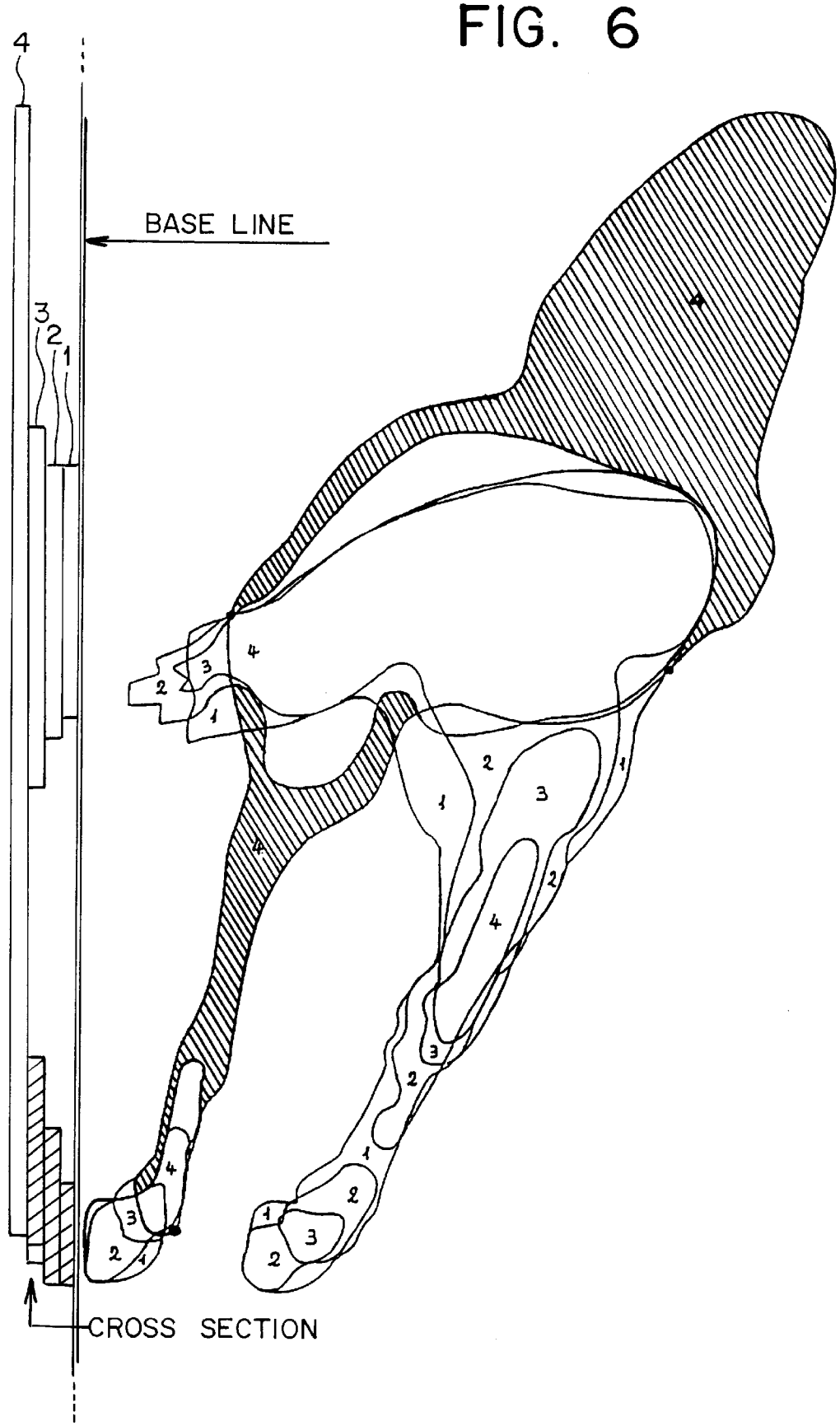

FIG. 6: LEVEL 4 Unification of two parts of the construction initiated independently of each other, forming a single base for the continuation of the construction, being guided by reference points taken in both parts. Significant projection of this level into space, calculated to support the following levels.

Final piece of a hoof, which will remain as the last plane of the figure.

Figure 7:
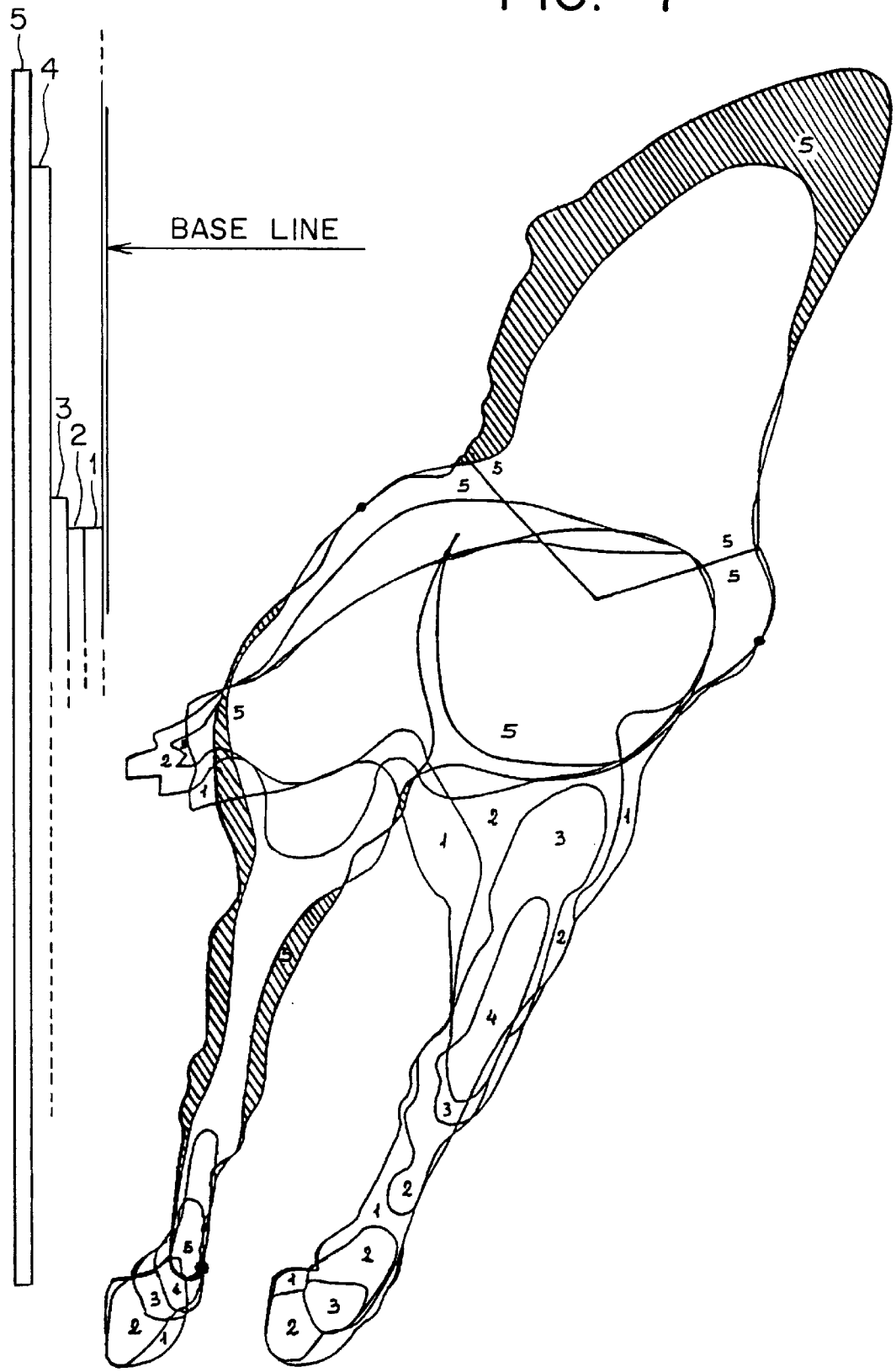
Figure 8:
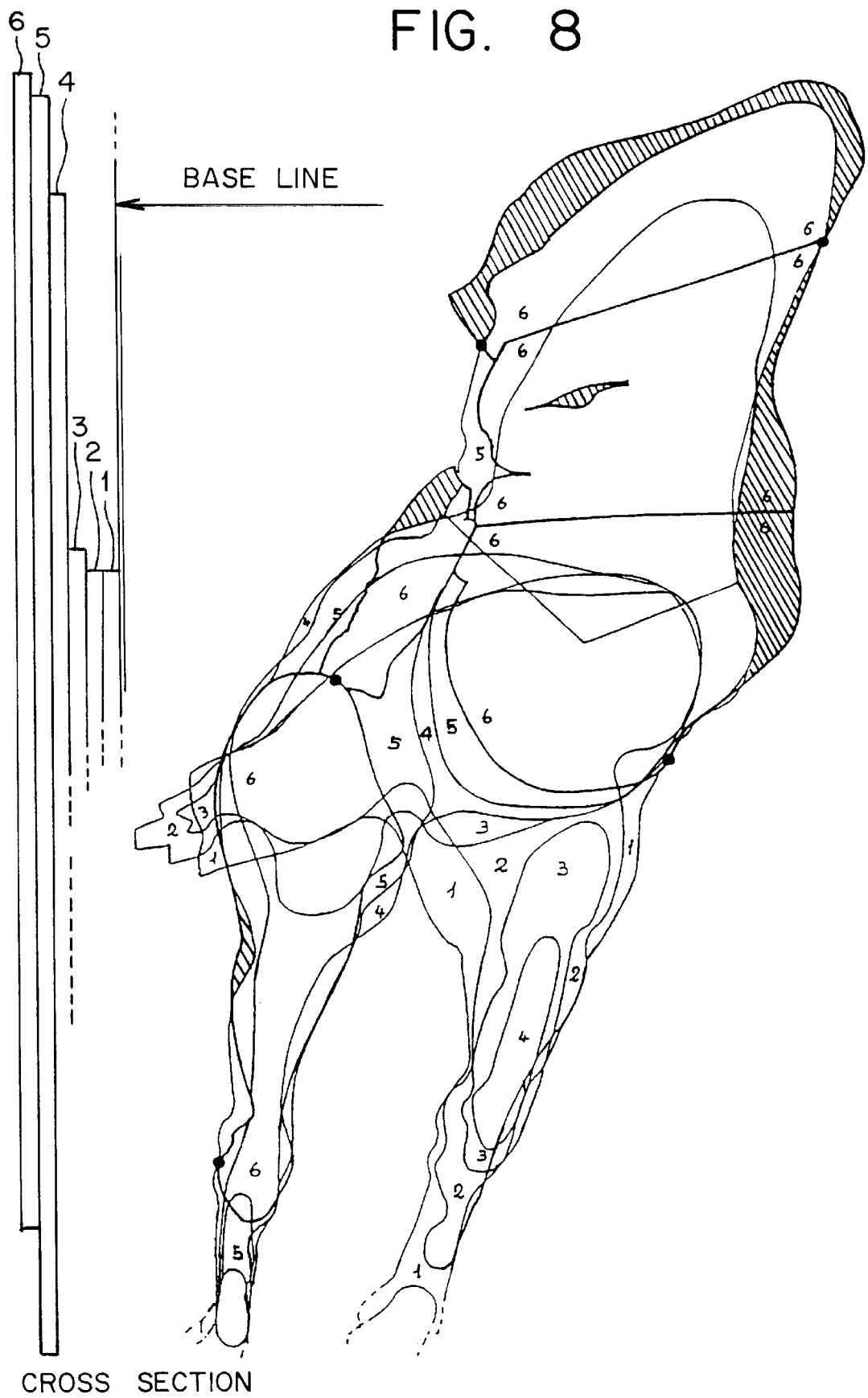

FIG. 7: LEVEL 5 Subdivided into two pieces dovetailed together, which will have two different colors or textures.

Start of the base of the rider, which is supported by the projection of the piece from the preceding level. Looking for points of reference in one of the pieces for their emplacement; the other should coincide only in its corresponding position.

FIG. 8: LEVEL 6

Composed of 5 interlocking or attached pieces, each of which will have its own color or texture, according to the layout. The cutout section in one of them will reveal the preceding level, giving a shaded effect (in this case a fold of clothing).

Two of the pieces cover the dovetailing in the preceding level.

The boot, the jacket and the pants of the rider have been started.

Figure 9:
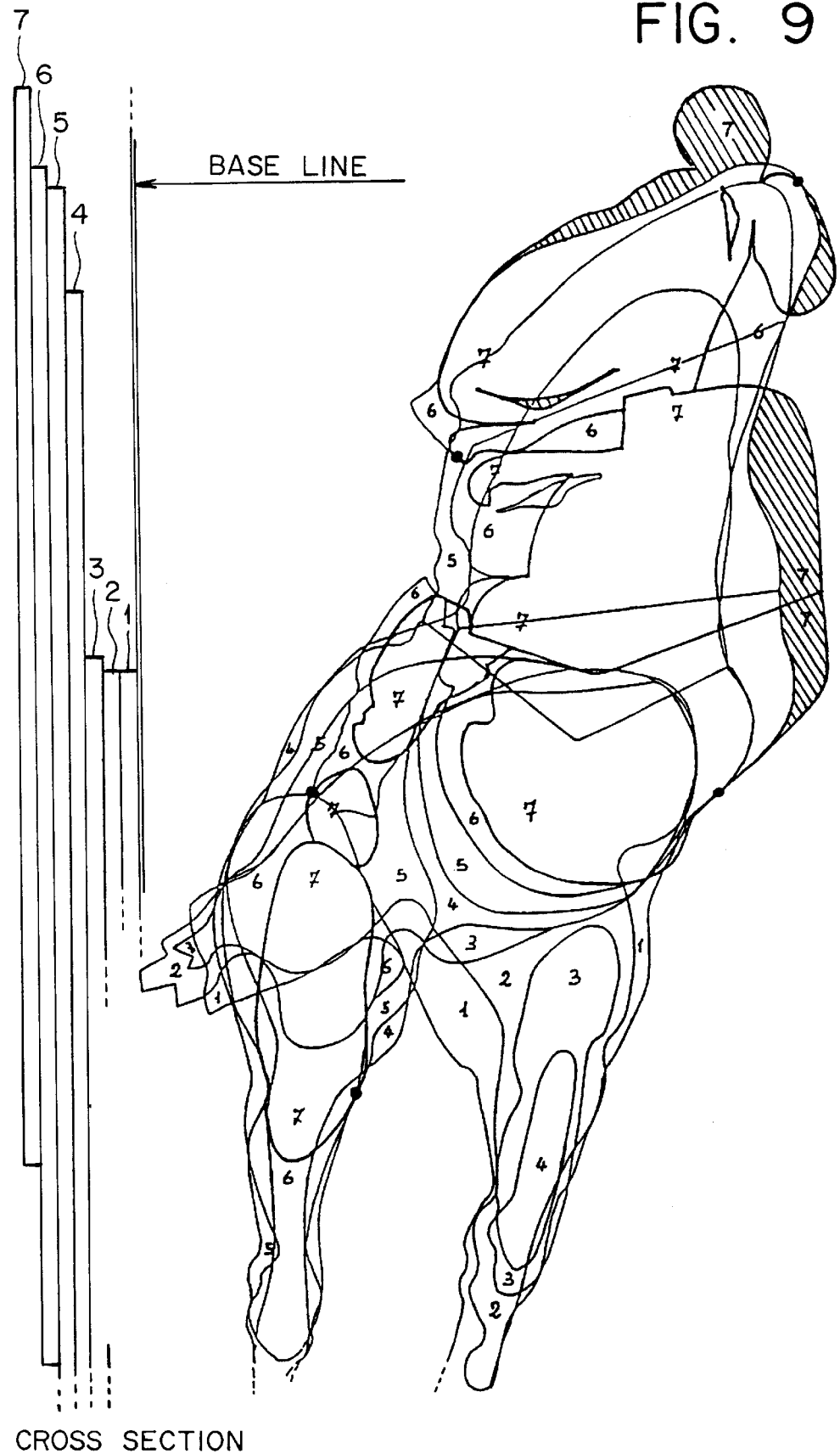

FIG. 9: LEVEL 7 Subdivided into 6 pieces, forming two groups independent of each other, one of them consisting of 4 pieces dovetailed together and the other of two pieces.

Two cutout sections in one of the pieces, revealing the preceding level, will give shading to reflect the folds of clothing visually.

One of these pieces starts the rider's saddle.

Having two independent groups of pieces necessitates a greater number of reference points for the exact positioning of the pieces.

Figure 10:
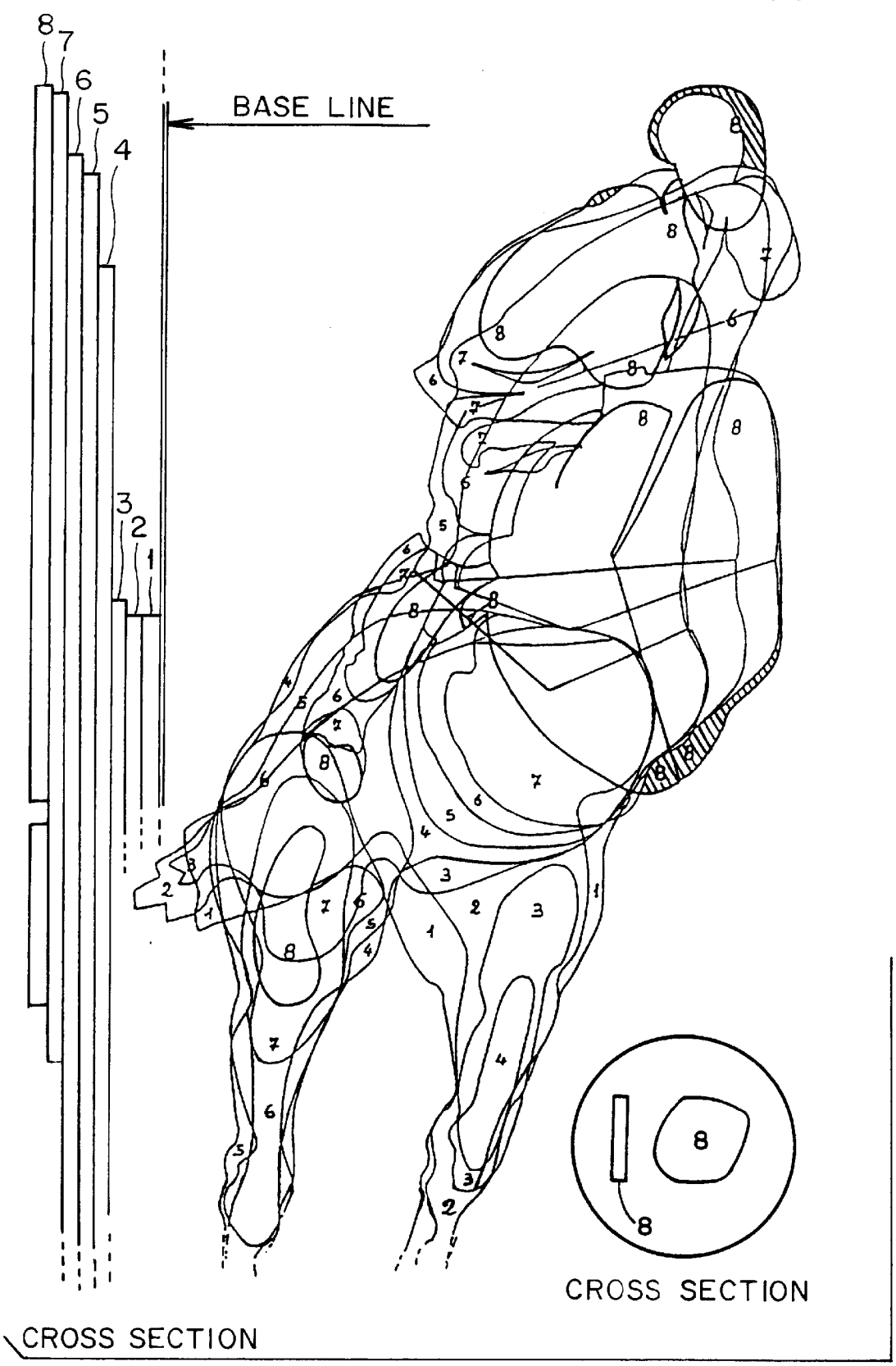

FIG. 10: LEVEL 8 Composed of one group of 2 pieces, another of 3 and two independent pieces.

The horse's right hind hoof is finished, starting the three-dimensionality of the figure.

Separately we have the first piece that starts the left front hoof.

Figure 11:
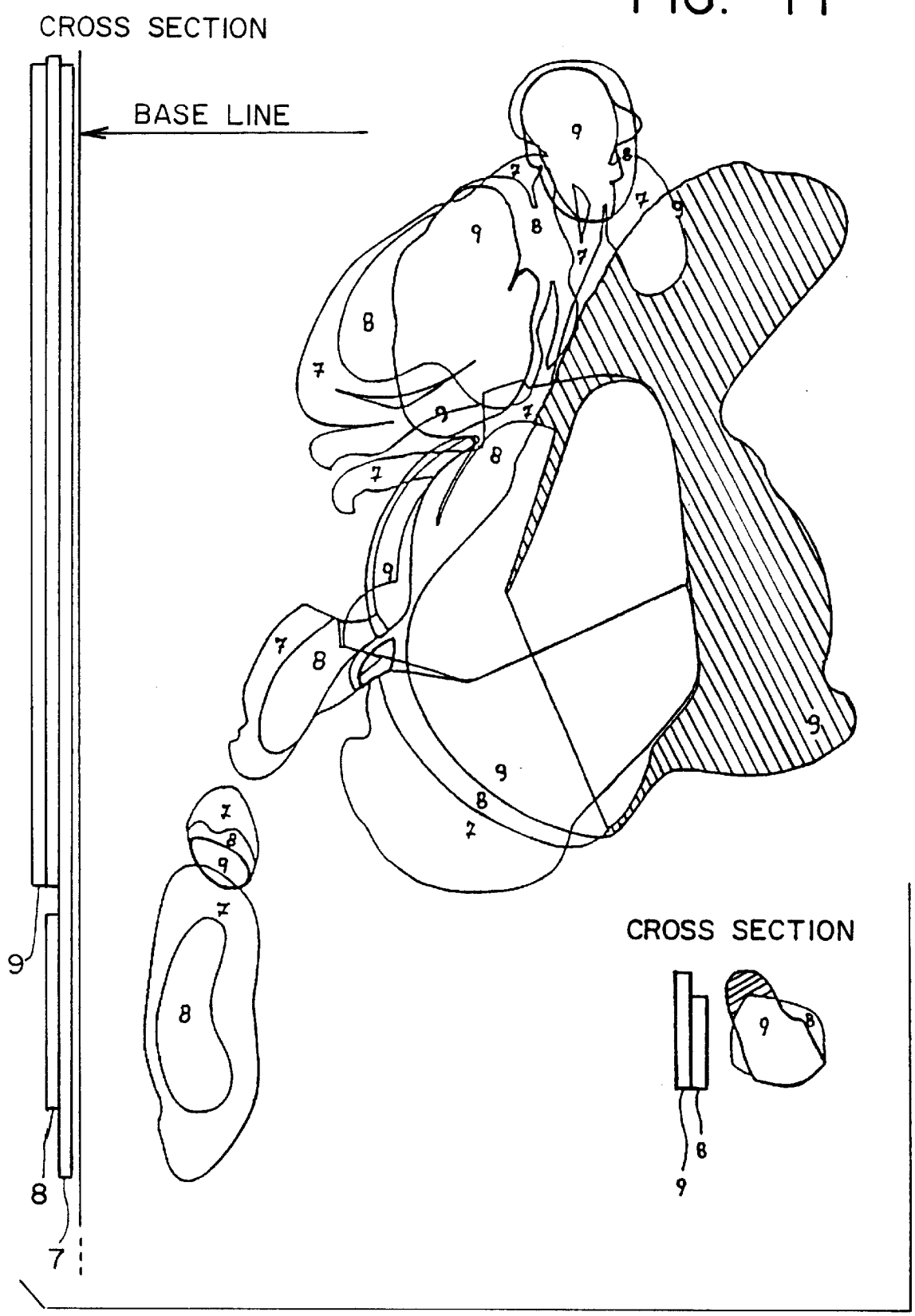

FIG. 11: LEVEL 9 Six pieces independent of each other, one finishing the boot and another the saddle.

We start the base of the horse's chest and heck.

A seventh piece forms the second level of the hoof, still separate from the body.

Figure 12:
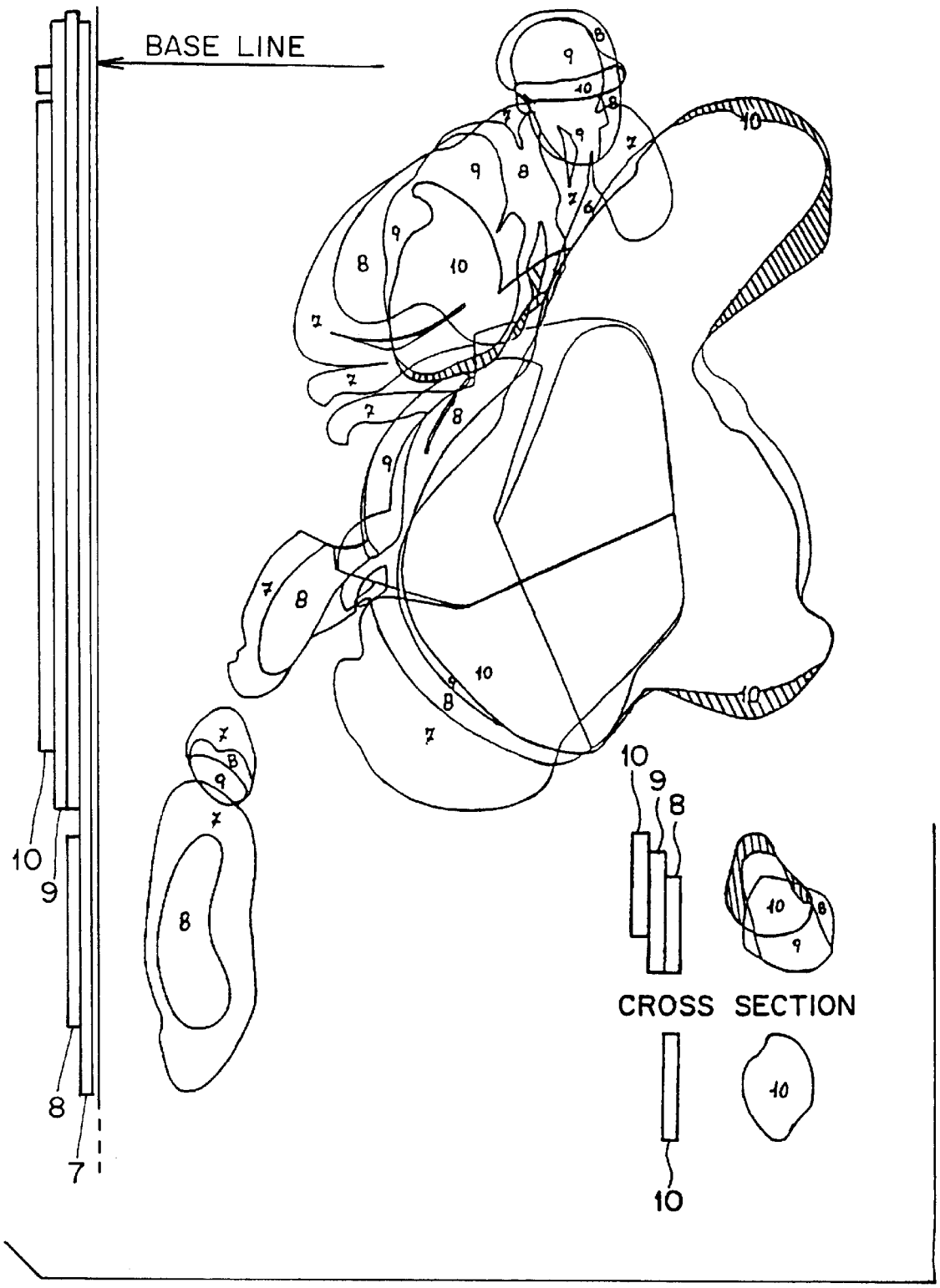

FIG. 12: LEVEL 10 Five pieces. Finish of the rider's head, start of the right front hoof and the third level of the left, both still separate from the body.

Figure 13:
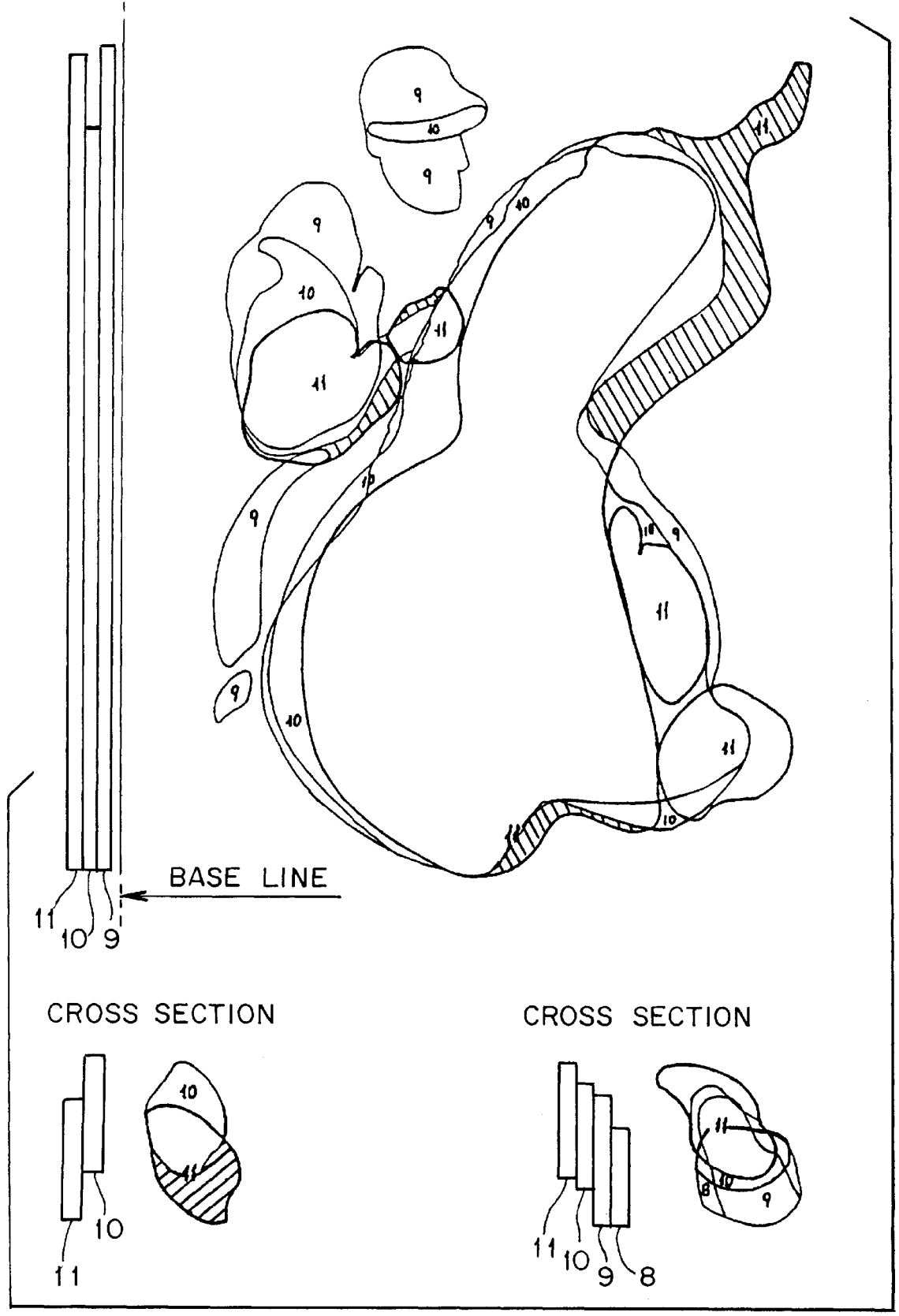

FIG. 13: LEVEL 11 Seven independent pieces that form the second level of the right hoof, the fourth level of the left hoof, the base of the horse's head and the base of the union between the left hoof and the body.

Figure 14:
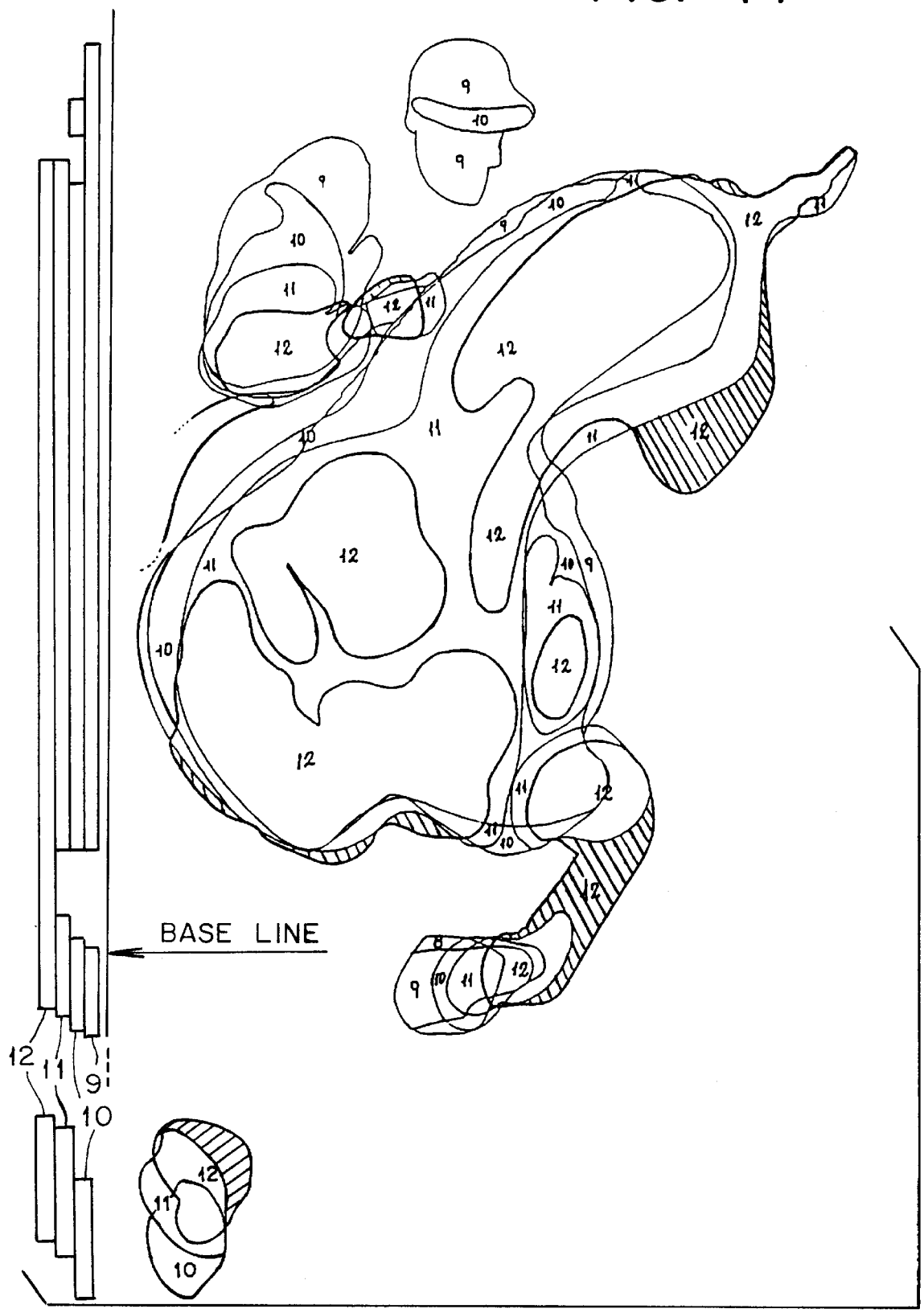

FIG. 14: LEVEL 12 Eight pieces. Two for the finish of the rider's arm and hand. Start of the horse's head. Base for the union of the right hoof to the body and the piece joining the left hoof to the horse. This last piece can be positioned on the body and a posteriori the pieces of the hoof can be placed in descending order, or the parts of the unit can be assembled separately and joined with this piece.

Figure 15:
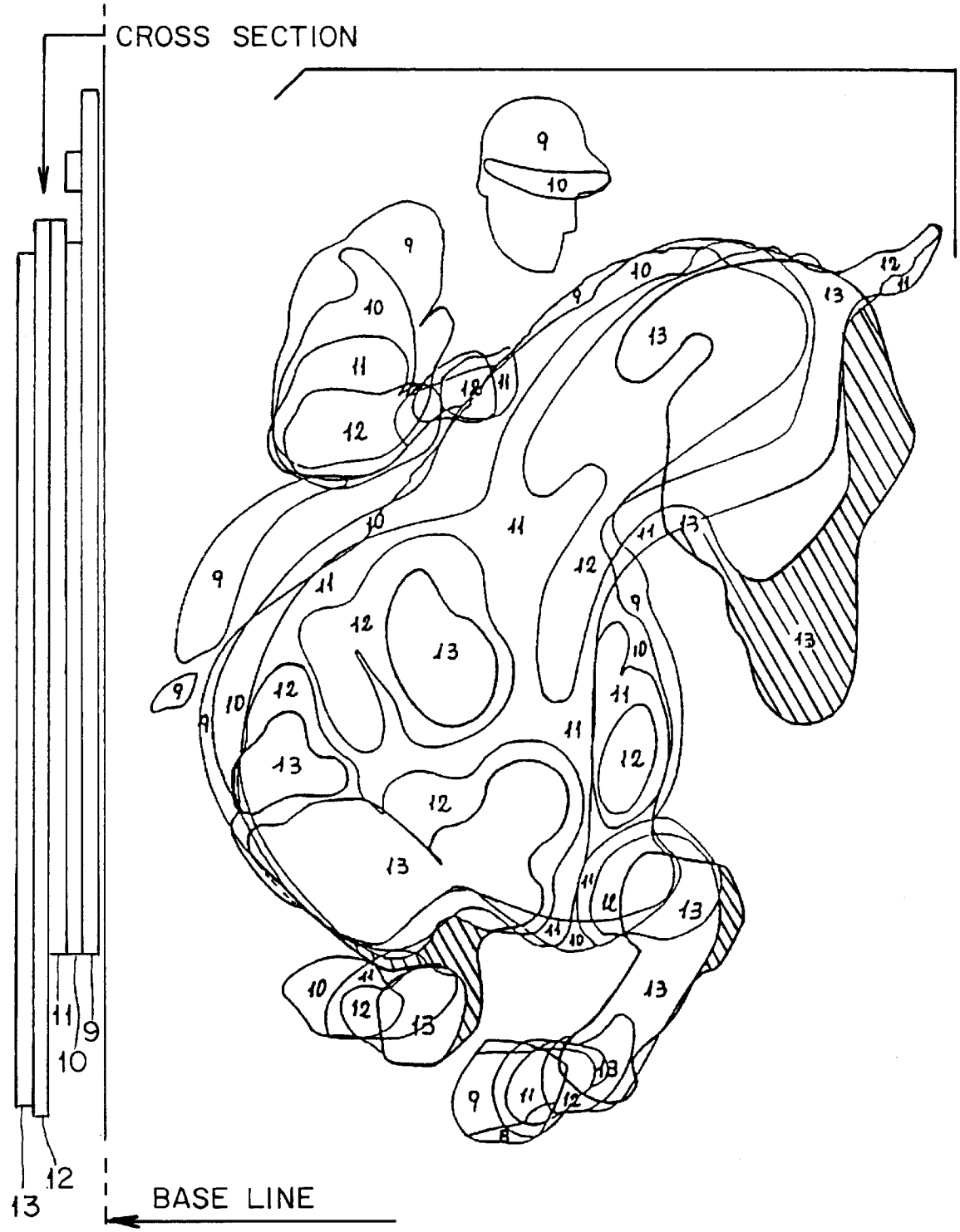

FIG. 15: LEVEL 13 Five independent pieces. Finish of the horse's chest. Uniting of the right hoof to the body, which can follow the same procedure used in Level 12 for the left hoof.

Figure 16:
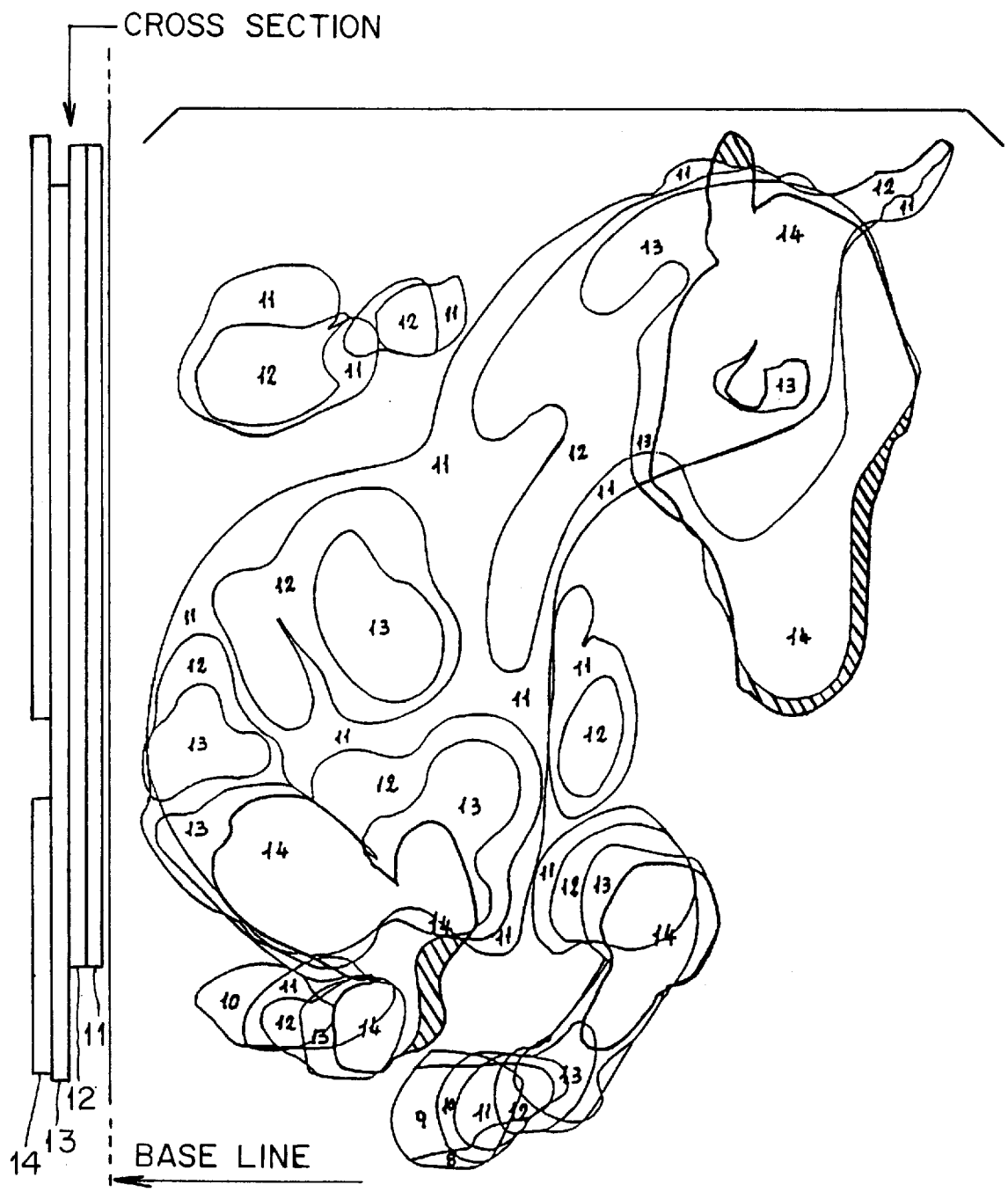

FIG. 16: LEVEL 14 Three pieces. Continuing to add volume to the hooves. Cutout in the head piece to make the horse's eye stand out with shading.

Figure 17:
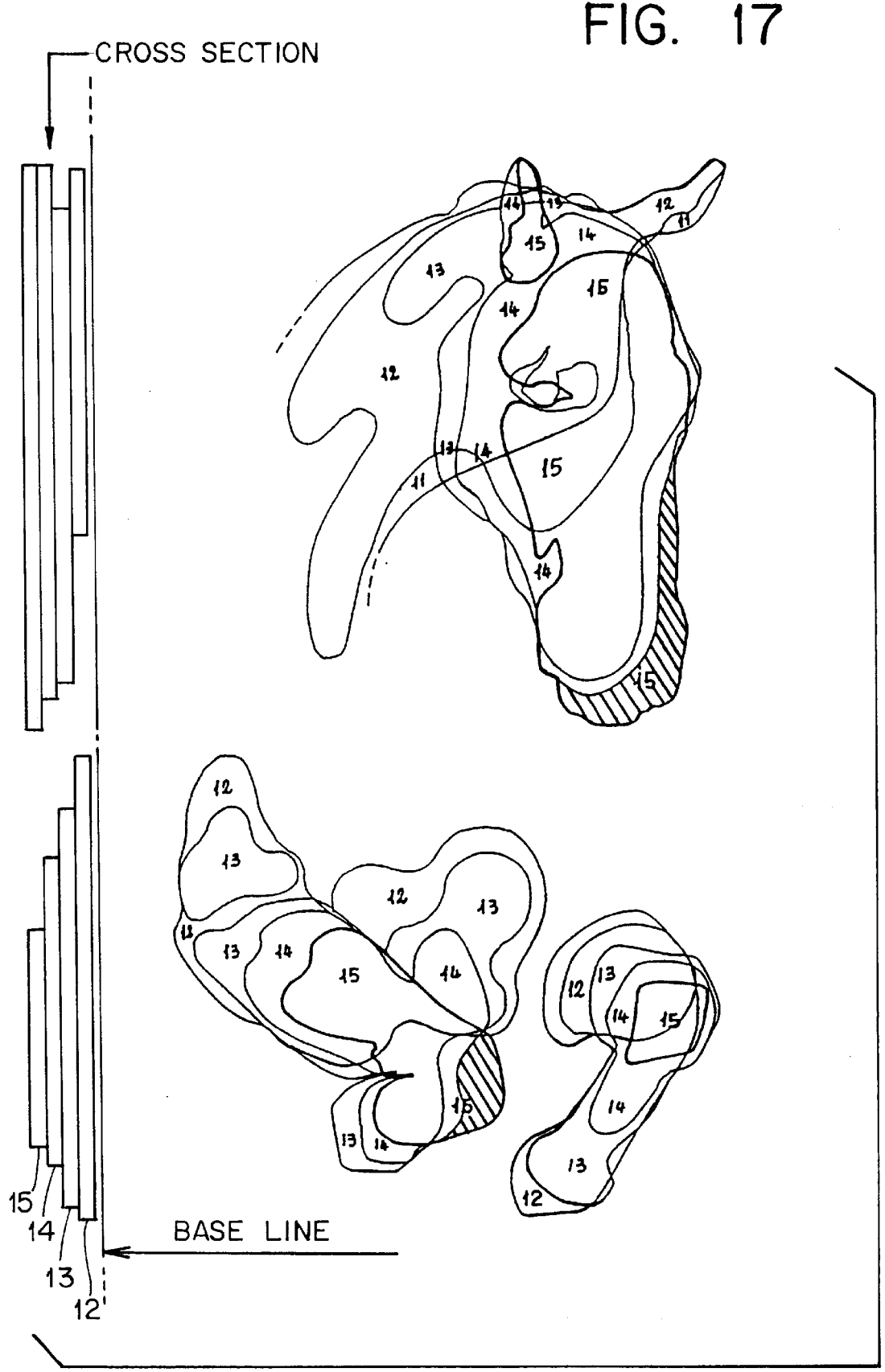

FIG. 17: LEVEL 15 Finish of the left front hoof. Finish of the right ear. Head piece with the cutout for the eye leaving visible only the part needed to achieve the effect of the eyes, utilizing the cutout of the preceding level.

Figure 18:
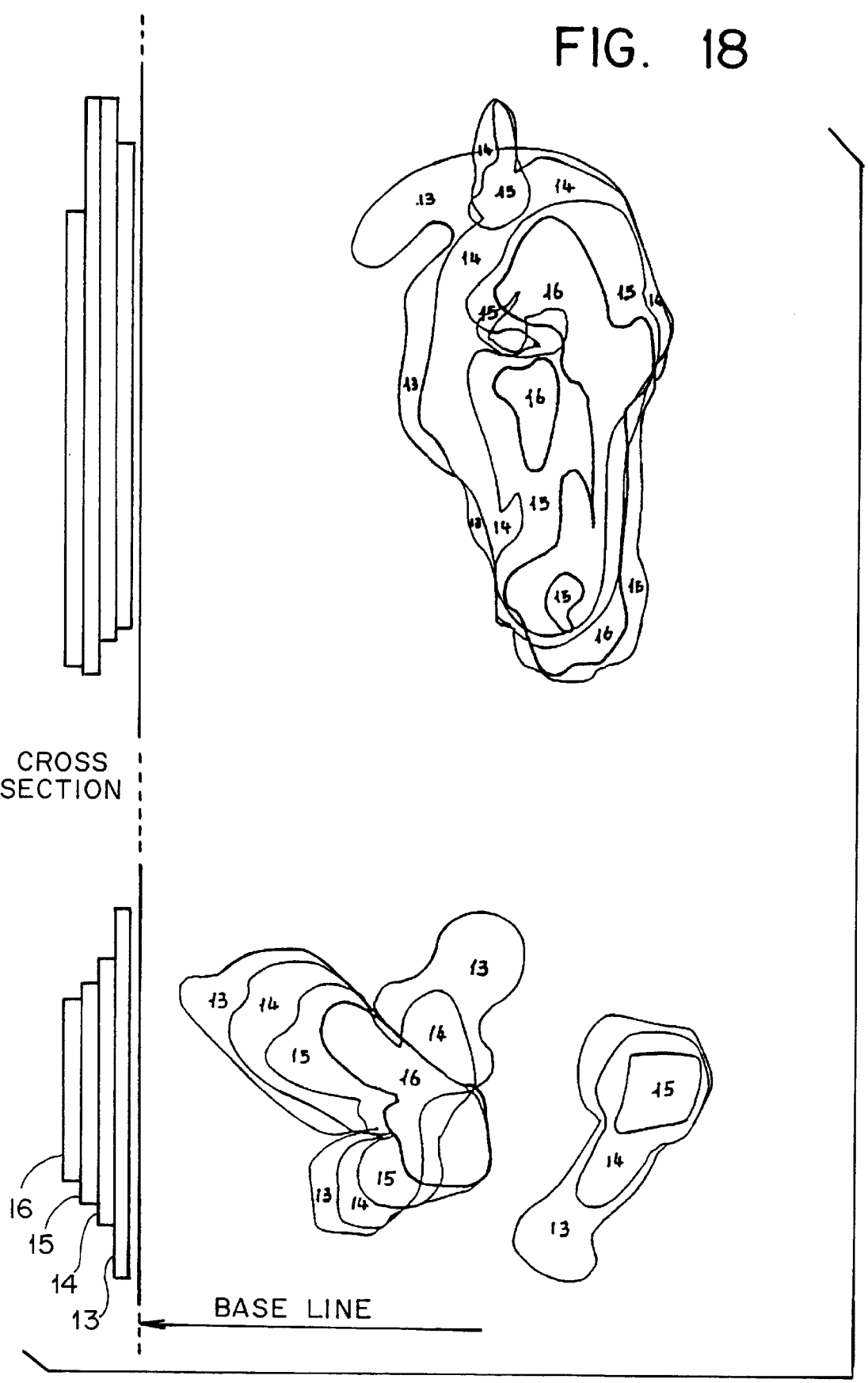

FIG. 18: LEVEL 16 Three pieces. Detach the cutout that will give the shading effects for the depth of the nose.

Figure 19:
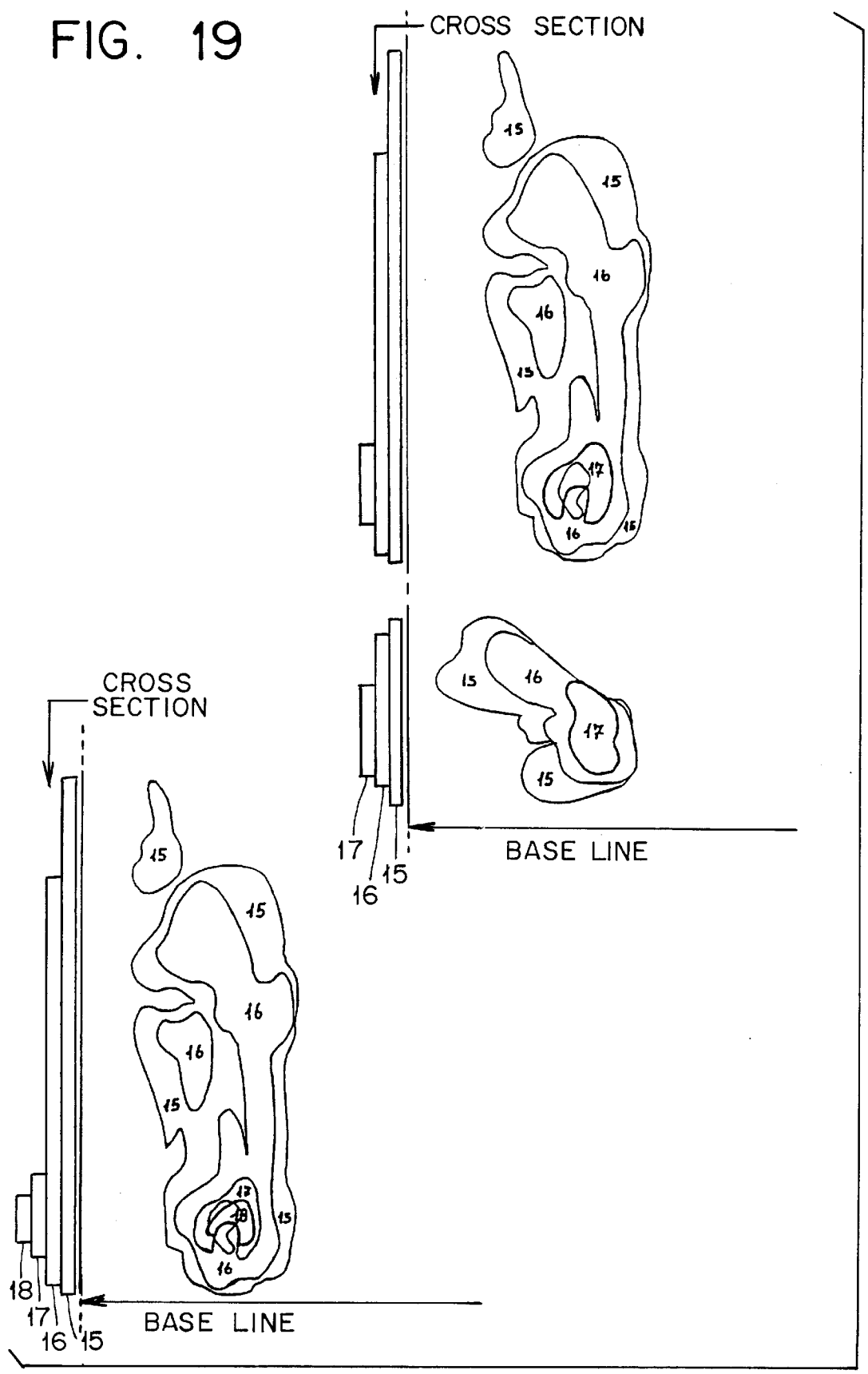

FIG. 19: LEVEL 17 Finish of the left front hoof.

LEVEL 18 Finish of the nose utilizing the cutout for the effects of depth with shading.

Figure 20:
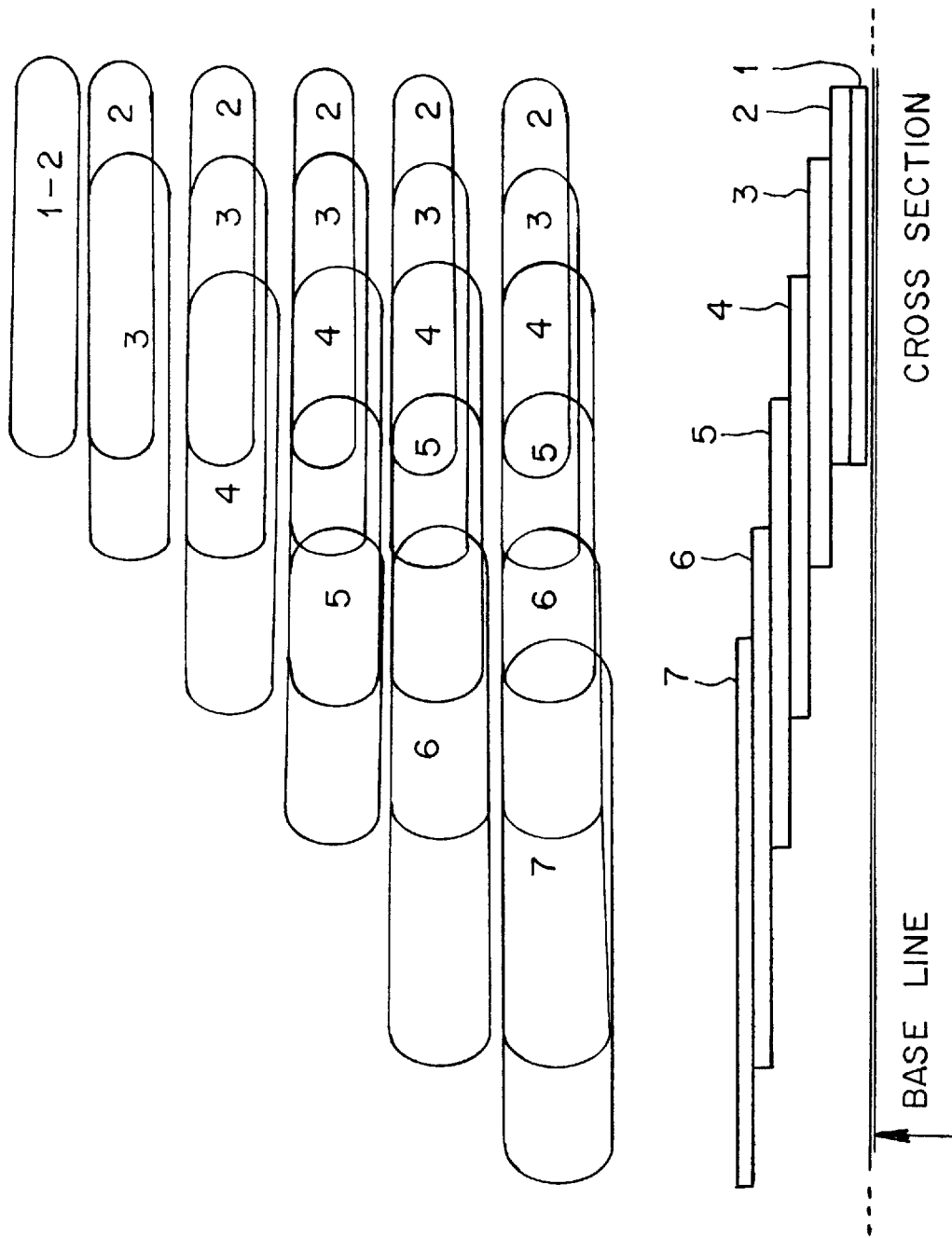

FIG. 20: Plan and cross section of the obstacle that the horse is jumping over.

Figure 21:
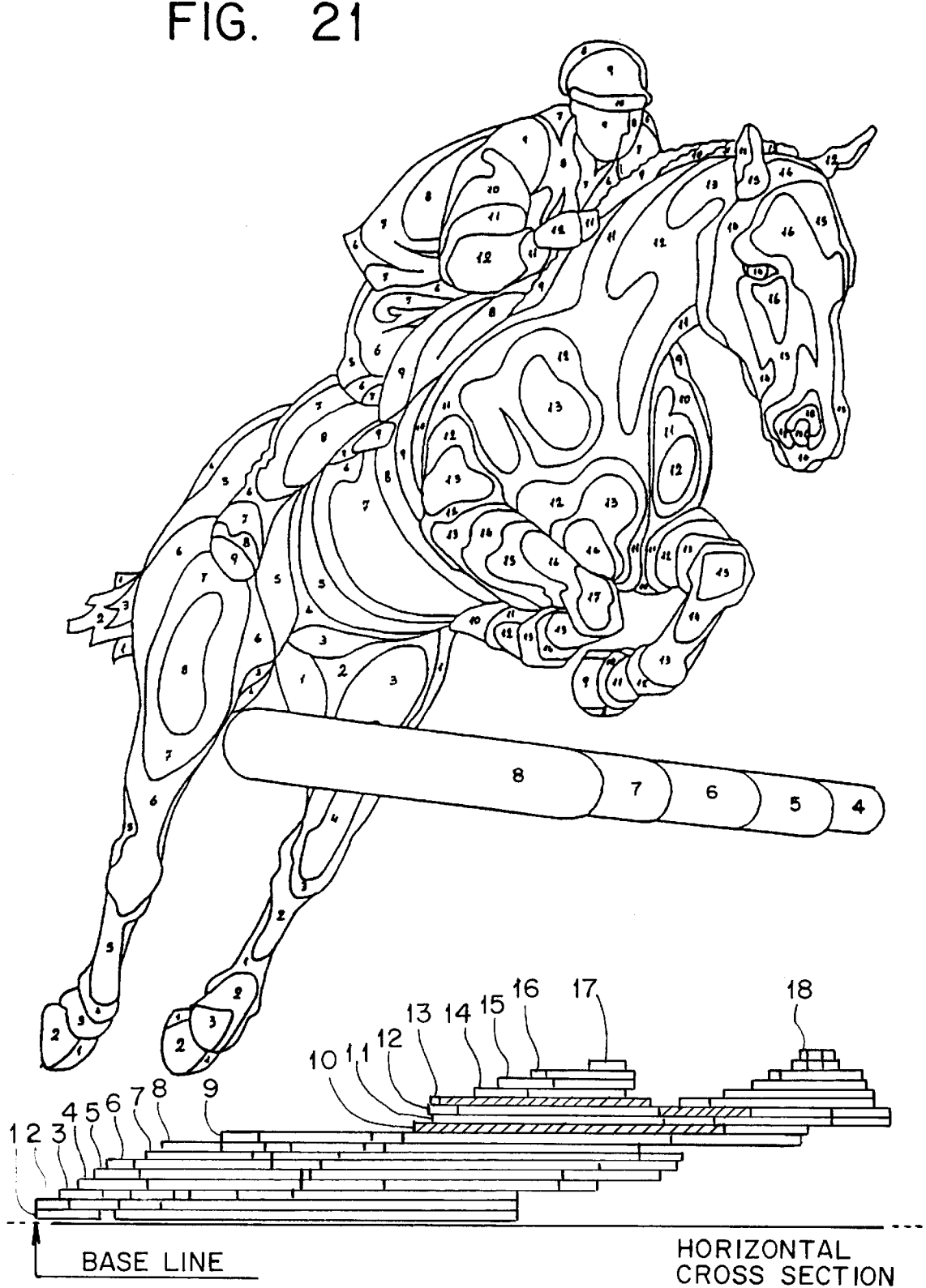

FIG. 21: Horizontal cross section of the work, detailing levels 10 (base of the horse's chest, the support of every structure above it), 12 and 13 (bases of the structure of the hooves).

Figure 22:
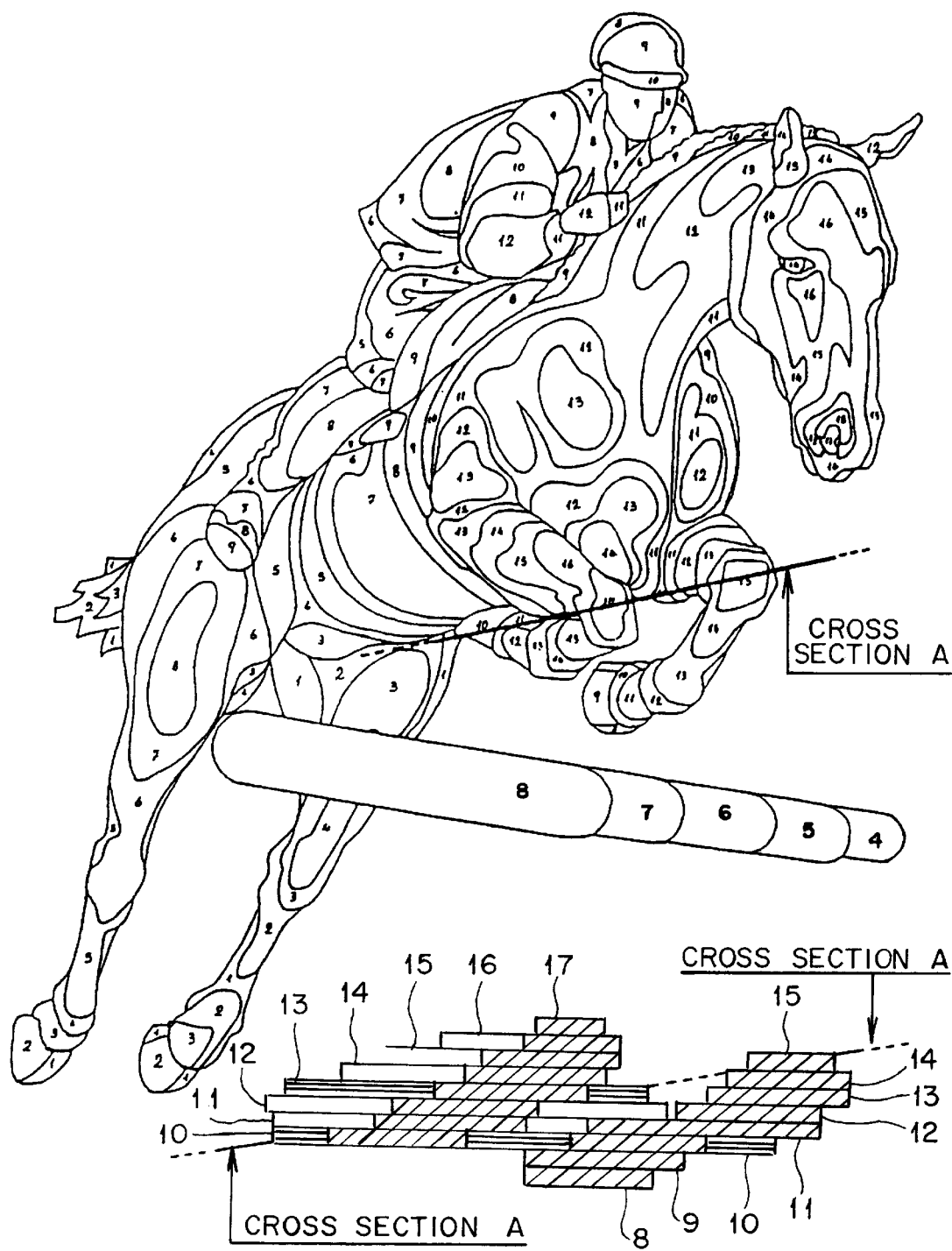

FIG. 22: Detail in cross section of the right and left front hooves, in ascending and descending order, starting from level 10 and showing the levels of the unification of the body.

FIG. 23: Diagonal cross section of the work, from the right ear to the left hoof.

It is worth pointing out that among other things said procedure permits:

A) Using several materials and/or metals, colors, textures in the same work and on the same level.

B) That the projection of the shading of the pieces over the preceding, or following, level expresses the depth of space and visualization between levels.

C) That, in the case of working the pieces in metal, a great amount of metal corresponding to the shaded spaces is saved, thereby achieving a lighter work, in addition to having greater perfection and definition in the details in the casting stage and less erosion in the polishing of the metal, by working with smaller and individual pieces, and not in a single block with greater weight.

D) Producing works with multiple special lighting effects, different textures and/or colors, which would be difficult and laborious to achieve with ordinary casting in a single block, or with other construction systems.

E) The last and most important unresolved problem facing existing technology and which constitutes the novelty of the procedure is the possibility of reproducing with volume a flat surface model, for example a photograph, with its entire range of lights and shades, backgrounds and figures, occupied spaces and empty spaces, etc.

When this invention has been put into practice, modifications may undoubtedly be introduced, without implying a departure from the basic principles that are claimed below.

What is claimed is:

1. A method for creating a three-dimensional figure or form starting from any flat surface image having an optical reality with a full range of shades, illumination, and occupied and empty spaces, comprising the steps of:

selecting an illustration to be reproduced as a three-dimensional figure;

selecting a plurality of points of intensity, wherein each of said points of intensity defines a level of the three-dimensional figure;

marking a starting point from which a sequence will progress to additional levels;

making the contour drawings of each piece;

joining each point that defines a level;

following a contour of the illustration to be reproduced until arriving back at the starting point;

breaking down the illustration by drawing each component piece individually;

cataloging each of the component pieces and grouping them by material, texture and color;

making the component pieces obtained from said drawings;

grouping and cataloging by level each of the component pieces;

selecting a base over which the three-dimensional figure will be assembled;

marking at level zero or the base the position at which level one will be placed on said base; and, joining the component pieces of one level to the immediately preceding level until arriving at the last level planned, thereby producing a three-dimensional figure or form having an optical reality with a full range of shades, illumination, and occupied and empty spaces.

2. The method for creating a three-dimensional figure or form starting from any flat surface image according to claim 1, wherein the component pieces establishing each level are layers of equal depth bordered by two flat surfaces opposite to each other.

3. The method for creating a three-dimensional figure or form starting from any flat surface image according to claim 2, wherein said layers of equal depth are bordered by two flat surfaces parallel to each other.

4. The method for creating a three-dimensional figure or form starting from any flat surface image according to claim 2, wherein said layers of equal depth are bordered by two flat surfaces diagonal to each other.

5. The method for creating a three-dimensional figure or form starting from any flat surface image according to claim 2, wherein said layers are of different depth.

6. The method for creating a three-dimensional figure or form starting from any flat surface image according to claim 5, wherein said layers of different depth are bordered by two sides, a first side with an smooth surface and a second side with a non-smooth surface.

7. The method for creating a three-dimensional figure or form starting from any flat surface image according to claim 5, wherein said layers of different depth are bordered by two sides, both side with surfaces that are not smooth.

8. The method for creating a three-dimensional figure or form starting from any flat surface image according to claim 7, wherein the non-smooth surface is molded.

9. The method for creating a three-dimensional figure or form starting from any flat surface image according to claim 7, wherein the non-smooth surface is stamped.

10. The method for creating a three-dimensional figure or form starting from any flat surface image according to claim 7, wherein the non-smooth surface is engraved.

11. The method for creating a three-dimensional figure or form starting from any flat surface image according to claim 7, wherein the non-smooth surface is worked in relief.

12. The method for creating a three-dimensional figure or form starting from any flat surface image according to claim 2, wherein said joining between said layers is accomplished by use of their two flat surface sides.

13. The method for creating a three-dimensional figure or form starting from any flat surface image according to claim 2, wherein said joining between said layers is accomplished between an even surface and support points planned on a rough surface.

14. The method for creating a three-dimensional figure or form starting from any flat surface image according to claim 13, wherein said joining is accomplished between both rough surfaces by means of support points planned in the layout.

15. The method for creating a three-dimensional figure or form starting from any flat surface image according to claim 13, wherein said support points are bolts.

16. The method for creating a three-dimensional figure or form starting from any flat surface image according to claim 13, wherein said support points are pins.

17. The method for creating a three-dimensional figure or form starting from any flat surface image according to claim 1, wherein the contours of the pieces are always parallel to each other.

18. The method for creating a three-dimensional figure or form starting from any flat surface image according to claim 1, wherein said pieces are subdivided by incisions.

19. The method for creating a three-dimensional figure or form starting from any flat surface image according to claim 1, wherein said pieces are'subdivided by indentations.

20. The method for creating a three-dimensional figure or form starting from any flat surface image according to claim 1, wherein said pieces are prepared mechanically through the use of molds.

21. The method for creating a three-dimensional figure or form starting from any flat surface image according to claim 1, wherein said pieces are prepared mechanically through the use of matrices.

22. The method for creating a three-dimensional figure or form starting from any flat surface image according to claim 1, wherein said pieces are prepared mechanically through the use of punches.

23. The method for creating a three-dimensional figure or form starting from any flat surface image according to claim 1, wherein said pieces are prepared mechanically by casting.

24. The method for creating a three-dimensional figure or form starting from any flat surface image according to claim 1, wherein said illustration is a photograph.

* * * * *